(12) United States Patent
Sakayori et al.

(10) Patent No.: US 11,566,108 B2
(45) Date of Patent: Jan. 31, 2023

(54) POLYIMIDE FILM, LAMINATE AND SURFACE MATERIAL FOR DISPLAY

(71) Applicant: DAI NIPPON PRINTING CO., LTD., Tokyo-to (JP)

(72) Inventors: Katsuya Sakayori, Tokyo-to (JP); Koudai Okada, Tokyo-to (JP); Ayako Furuse, Tokyo-to (JP); Keisuke Wakita, Tokyo-to (JP); Yoshihiro Kobayashi, Tokyo-to (JP); Aya Takao, Tokyo-to (JP); Takanori Maeda, Tokyo-to (JP); Nahomi Kanazawa, Tokyo-to (JP); Takayuki Ota, Tokyo-to (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 612 days.

(21) Appl. No.: 16/323,485

(22) PCT Filed: Aug. 8, 2017

(86) PCT No.: PCT/JP2017/028783
§ 371 (c)(1),
(2) Date: Apr. 11, 2019

(87) PCT Pub. No.: WO2018/030410
PCT Pub. Date: Feb. 15, 2018

(65) Prior Publication Data
US 2019/0375894 A1 Dec. 12, 2019

(30) Foreign Application Priority Data

Aug. 10, 2016 (JP) .............................. JP2016-158254
Aug. 7, 2017 (JP) .............................. JP2017-152198

(51) Int. Cl.
*C08G 73/10* (2006.01)
*B32B 27/28* (2006.01)
*B32B 27/30* (2006.01)

(52) U.S. Cl.
CPC ........ *C08G 73/1039* (2013.01); *B32B 27/281* (2013.01); *B32B 27/308* (2013.01);
(Continued)

(58) Field of Classification Search
CPC .............. C08G 73/1039; C08G 73/106; C08G 73/1042; C08G 73/1064; C08J 7/043;
(Continued)

(56) References Cited

U.S. PATENT DOCUMENTS

2007/0169886 A1 7/2007 Watanabe et al.
2008/0132667 A1 6/2008 Makinoshima et al.
(Continued)

FOREIGN PATENT DOCUMENTS

CN 105461923 A * 4/2016
JP S63-170420 A 7/1988
(Continued)

OTHER PUBLICATIONS

Sigma Aldrich, "1,3-Bis(3-aminopropyl)-1,1,3,3-tetramethyldisiloxane", https://www.sigmaaldrich.com/catalog/product/aldrich/14534?lang=en&region=US# Accessed: Feb. 27, 2021 (Year: 2021).*
(Continued)

*Primary Examiner* — John D Freeman
(74) *Attorney, Agent, or Firm* — Oliff PLC

(57) ABSTRACT

A polyimide film includes a polyimide in which a specific amount of molecular framework containing one or two silicon atoms in its main chain, wherein a total light transmittance measured in accordance with JIS K7361-1 is 85% or more; wherein a yellowness index calculated in accordance with JIS K7373-2006 is 30 or less; wherein a glass
(Continued)

transition temperature is in a temperature range of from 150° C. to 400° C.; and wherein a tensile elastic modulus at 25° C. obtained by measuring a 15 mm×40 mm test piece at a tensile rate of 10 mm/min and a chuck distance of 20 mm in accordance with JIS K7127, is 1.8 GPa or more.

15 Claims, 1 Drawing Sheet

(52) U.S. Cl.
CPC ....... *C08G 73/106* (2013.01); *C08G 73/1042* (2013.01); *B32B 2307/412* (2013.01); *B32B 2307/51* (2013.01); *B32B 2457/20* (2013.01)

(58) Field of Classification Search
CPC . C08J 7/046; C08J 2379/08; C08J 5/18; C08J 7/0427; B32B 27/281; B32B 27/308; B32B 2307/412; B32B 2307/51; B32B 2457/20; C09D 179/08; C08L 79/08
See application file for complete search history.

(56) References Cited

U.S. PATENT DOCUMENTS

| | | | |
|---|---|---|---|
| 2011/0178266 A1 | 7/2011 | Cho et al. | |
| 2013/0274394 A1 | 10/2013 | Ju et al. | |
| 2015/0376466 A1 | 12/2015 | Mitamura et al. | |
| 2018/0196169 A1* | 7/2018 | Choi | C09D 133/08 |

FOREIGN PATENT DOCUMENTS

| | | |
|---|---|---|
| JP | S63-317554 A | 12/1988 |
| JP | H05-341291 A | 12/1993 |
| JP | H10-114824 A | 5/1998 |
| JP | 2000-017072 A | 1/2000 |
| JP | 2000-026602 A | 1/2000 |
| JP | 2000-160007 A | 6/2000 |
| JP | 2006-199945 A | 8/2006 |
| JP | 2006-253185 A | 9/2006 |
| JP | 2008-064905 A | 3/2008 |
| JP | 2010-221523 A | 10/2010 |
| JP | 2012-503701 A | 2/2012 |
| JP | 2014-501301 A | 1/2014 |
| KR | 10-2015-0125324 A | 11/2015 |
| KR | 10-2016-0067409 A | 6/2016 |
| TW | 201442880 A | 11/2014 |
| WO | 2005/084948 A1 | 9/2005 |
| WO | 2014/098235 A1 | 6/2014 |

OTHER PUBLICATIONS

Li, L., Xu, Y., Che, J. et al. Transparent fluorinated poly(imide siloxane) copolymers with good adhesivity. Macromol. Res. 25, 1076-1084 (2017). https://doi.org/10.1007/s13233-017-5146-1 (Year: 2017).*
Machine translation of CN 105461923. (Year: 2016).*
Nov. 7, 2017 International Search Report issued in International Patent Application No. PCT/JP2017/028783.
Plastic Material; China Light Industry Press, Jan. 2010. (published 2010).

* cited by examiner

Maximum stress part

POLYIMIDE FILM, LAMINATE AND SURFACE MATERIAL FOR DISPLAY

TECHNICAL FIELD

The disclosure relates to a polyimide film, a laminate, and a surface material for display.

BACKGROUND ART

A thin glass plate has excellent hardness, heat resistance, etc. On the other hand, it cannot be easily bent, is easily broken when dropped, and has a problem with processability. Also, it has a problem in that it is heavy compared to plastic products. Due to these reasons, recently, glass products have been replaced with resin products such as a resin substrate and a resin film, from the viewpoint of processability and weight reduction, and studies on resin products that can substitute for glass products have been conducted.

For example, a rapid progress of electronics such as liquid crystal displays, organic EL displays and touch panels, has created a demand for thinner, lighter and flexible devices. In these devices, conventionally, various electron elements such as a thin transistor and a transparent electrode are formed on a thin glass plate. By changing the thin glass plate to a resin film, a flexible, thin, light panel with increased impact resistance, can be obtained.

In general, polyimide resin is a highly heat resistant resin obtained by a dewatering cyclization reaction of a polyamide acid obtained by a condensation reaction between an aromatic tetracarboxylic anhydride and an aromatic diamine. However, since the color of polyimide resin is generally yellow or brown, it is difficult for polyimide resin to be used in fields where transparency is required, such as display and optical applications. Therefore, the application of highly-transparent polyimide to display members has been studied. For example, in Patent Document 1, a polyimide resin obtained by a reaction of at least one acyl-containing compound selected from the group consisting of 1,2,4,5-cyclohexanetetracarboxylic acid, 1,2,4,5-cyclohexanetetracarboxylic dianhydride and reactive derivatives thereof, with at least one imino-forming compound which is represented by a specific formula and selected from the group consisting of compounds containing at least one phenylene group and at least one isopropylidene group, is disclosed as a polyimide resin excellent in heat resistance, transparency and low water absorption and is described as being suitable for materials of a substrate for flat panel display, mobile phone, etc.

Patent Document 2 discloses a transparent polyimide film which contains a unit structure derived from an aromatic dianhydride and an aromatic diamine and which further contains an additive for improving tear strength, or a unit structure derived from a monomer including a functional group selected from the group consisting of a hexafluro group, a sulfone group and an oxy group. In Patent Document 3, a polyimide film that has a peak top residing in a specific temperature range in a tan δ curve obtained by dividing a loss elastic modulus by a storage elastic modulus, is disclosed as a polyimide film with excellent transparency and heat resistance.

In Patent Document 4, a polyimide film obtained by imidizing a polyimide precursor produced by use of, as monomer components, a specific fluorine-based aromatic diamine and a silicone compound containing a siloxane framework that contains 3 to 200 silicon atoms, is disclosed for the purpose of obtaining, as a polyimide film used for substrates of flexible devices, a polyimide film which is colorless and transparent, which has a low residual stress that is generated between the polyimide film and an inorganic film, and which has excellent mechanical properties and thermal properties. Patent Document 4 describes that as a result of forming a polyimide film including an inorganic film (SiN film) by use of the polyimide precursor, the polyimide film showed no cracking or peeling (o) or showed cracking (A) after a bending test in which the polyimide film was bent 10 times, repeatedly.

Patent Document 5 describes that as a polyimide having a low refractive index and high folding endurance, silicone diamine containing 2 to 21 silicon atoms is contained by 10 wt % or more of the weight of the diamine raw material.

Meanwhile, in the polyimide molded article used for liquid crystal alignment films and so on (Patent Document 6), diaminosiloxane is used as a diamine component, which serves as a raw material for polyimide resin, in order to increase adhesion to an inorganic substrate.

CITATION LIST

Patent Document 1: Japanese Patent Application Laid-Open (JP-A) No. 2006-199945
Patent Document 2: Japanese translation of PCT international application No. 2014-501301
Patent Document 3: Japanese translation of PCT international application No. 2012-503701
Patent Document 4: WO2014/098235
Patent Document 5: JP-A No. 2008-64905
Patent Document 6: JP-A No. S63-170420

SUMMARY OF INVENTION

Technical Problem

A mobile device with a foldable display is generally carried by a user while it is in the folded state. Accordingly, even if the folded state of the display continues for a long period of time, a flexible display mounted on the mobile device is required to be able to return to the original state when it is unfolded and flattened. Substrates and surface materials for flexible display are also required to show restorability even after being bent for a long period of time (hereinafter, it may be referred to as static flex resistance).

On the other hand, substrates and surface materials for flexible display are required to have not only resistance to repeated bending, but also functions to prevent surface damage and damage to a touch sensor or display panel disposed thereunder.

The flex resistance and surface hardness of a resin film are considered to be conflicting properties, as described below. However, there is a demand for a resin film having both flex resistance and enough surface hardness as a protection film.

The disclosed embodiments were achieved in light of the above circumstance. An object of the disclosed embodiments is to provide a resin film configured to have increased flex resistance and to suppress a reduction in surface hardness.

Another object of the disclosed embodiments is to provide a laminate including the resin film, and a surface material for display, which is the resin film or the laminate.

Solution to Problem

In a first embodiment, there is provided a polyimide film comprising a polyimide containing a structure represented by the following general formula (1), wherein a total light transmittance measured in accordance with JIS K7361-1 is 85% or more;
wherein a yellowness index calculated in accordance with JIS K7373-2006 is 30 or less;
wherein a glass transition temperature is in a temperature range of from 150° C. to 400° C.; and
wherein a tensile elastic modulus at 25° C. obtained by measuring a 15 mm×40 mm test piece at a tensile rate of 10 mm/min and a chuck distance of 20 mm in accordance with JIS K7127, is 1.8 GPa or more:

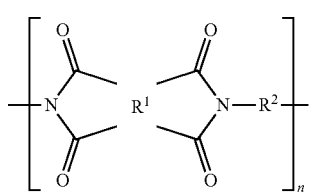

General Formula (1)

where $R^2$ is a tetravalent group that is a tetracarboxylic acid residue containing an aromatic ring or aliphatic ring; $R^2$ is a divalent group that is a diamine residue; 10 mol % to 50 mol % of total $R^2$s are diamine residues each containing one or two silicon atoms in a main chain thereof, and 50 mol % to 90 mol % of total $R^2$s are diamine residues each containing no silicon atom and containing an aromatic ring or aliphatic ring; and n is a number of repeating units.

In another embodiment, there is provided the polyimide film wherein a birefringence index in the thickness direction at a wavelength of 590 nm, is 0.020 or less.

In another embodiment, there is provided the polyimide film wherein, when a static bending test is carried out in accordance with the following static bending test method, an interior angle measured by the test is 120° or more:
[Static Bending Test Method]

A polyimide film test piece cut to a size of 15 mm×40 mm, is bent at a position half the long side so that both long side ends of the polyimide film test piece sandwich upper and lower surfaces of a metal piece having a thickness of 6 mm (100 mm×30 mm×6 mm); they are fixed by tape so that an overlapping margin of each end of the polyimide film test piece with the upper or lower surface of the metal piece, is mm; while being in this state, the metal piece and the fixed polyimide film test piece are sandwiched between glass plates (100 mm×100 mm×0.7 mm) to fix the polyimide film test piece in a state of being bent with an inner diameter of 6 mm; at this time, dummy test pieces are each interposed into a part where the polyimide film test piece is not present between the metal piece and either one of the glass plates, and the glass plates are fixed parallel to one another by tape; the polyimide film test piece bent and fixed in this state, is left to stand for 24 hours in a relative humidity (RH) environment of 60° C.±2° C. and 93%±2%; then, the glass plates and the fixing tape are removed to release force applied to the polyimide film test piece; then, one end of the test piece is fixed, and the interior angle of the polyimide film test piece 30 minutes after the release of the applied force, is measured.

In another embodiment, there is provided the polyimide film wherein the polyimide containing the structure represented by the general formula (1) contains an aromatic ring and at least one selected from the group consisting of (i) a fluorine atom, (ii) an aliphatic ring and (iii) a structure that aromatic rings are linked by a sulfonyl group or an alkylene group to which fluorine is optionally bound by substitution.

In another embodiment, there is provided the polyimide film wherein, for the polyimide containing the structure represented by the general formula (1), $R^1$ in the general formula (1) is at least one tetravalent group selected from the group consisting of a cyclohexanetetracarboxylic dianhydride residue, a cyclopentanetetracarboxylic dianhydride residue, a dicyclohexane-3,4,3',4'-tetracarboxylic dianhydride residue, a cyclobutanetetracarboxylic dianhydride residue, a pyromellitic dianhydride residue, a 3,3',4,4'-biphenyltetracarboxylic dianhydride residue, a 2,2',3,3'-biphenyltetracarboxylic dianhydride residue, a 4,4'-(hexafluoroisopropylidene) diphthalic anhydride residue, a 3,4'-(hexafluoroisopropylidene)diphthalic anhydride residue, a 3,3'-(hexafluoroisopropylidene)diphthalic anhydride residue, a 4,4'-oxydiphthalic anhydride residue, and a 3,4'-oxydiphthalic anhydride residue.

In another embodiment, there is provided the polyimide film wherein, for the polyimide containing the structure represented by the general formula (1), the diamine residue containing no silicon atom and containing an aromatic ring or aliphatic ring, which is $R^2$ in the general formula (1), is at least one divalent group selected from the group consisting of a trans-cyclohexanediamine residue, a trans-1,4-bismethylenecyclohexane diamine residue, a 4,4'-diaminodiphenylsulfone residue, a 3,4'-diaminodiphenylsulfone residue, a 2,2-bis(4-aminophenyl)propane residue, a 2,2-bis(4-aminophenyl)hexafluoropropane residue, and a divalent group represented by the following general formula (2):

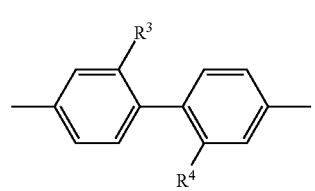

General Formula (2)

where each of $R^3$ and $R^4$ is independently a hydrogen atom, an alkyl group, or a perfluoroalkyl group.

In another embodiment, there is provided a laminate wherein the polyimide film according to the disclosed embodiments and a hard coat layer containing a polymer of at least one of a radically polymerizable compound and a cationically polymerizable compound, are adjacently disposed.

In another embodiment, there is provided the laminate wherein the radically polymerizable compound is a compound containing two or more (meth)acryloyl groups per molecule, and the cationically polymerizable compound is a compound containing two or more groups per molecule, which are selected from the group consisting of an epoxy group and an oxetanyl group.

In another embodiment, there is provided a surface material for display, wherein the surface material is the polyimide film according to the disclosed embodiments, or the laminate according to the disclosed embodiments.

In another embodiment, there is provided a surface material for flexible display, wherein the surface material is the polyimide film according to the disclosed embodiments, or the laminate according to the disclosed embodiments.

Advantageous Effects of Invention

According to the disclosed embodiments, a resin film configured to have increased flex resistance and to suppress a reduction in surface hardness, can be provided.

According to the disclosed embodiments, a laminate including the resin film, and a surface material for display, which is the resin film or the laminate, can be provided.

BRIEF DESCRIPTION OF DRAWINGS

In the accompanying drawings.

DESCRIPTION OF EMBODIMENTS

I. Polyimide Film

Figure 1:
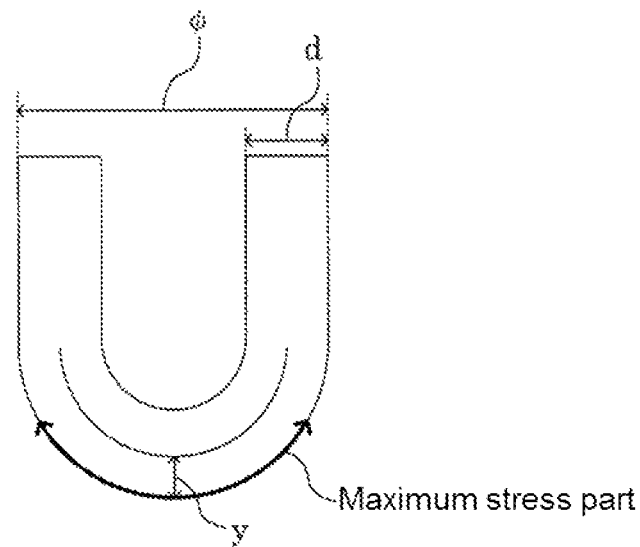
FIG. 1 is an explanatory diagram of the maximum stress generated in film bending.

The polyimide film according to the disclosed embodiments is a polyimide film comprising a polyimide containing a structure represented by the following general formula (1), wherein a total light transmittance measured in accordance with JIS K7361-1 is 85% or more;

wherein a yellowness index calculated in accordance with JIS K7373-2006 is 30 or less;

wherein a glass transition temperature is in a temperature range of from 150° C. to 400° C.; and wherein a tensile elastic modulus at 25° C. obtained by measuring a 15 mm×40 mm test piece at a tensile rate of 10 mm/min and a chuck distance of 20 mm in accordance with JIS K7127, is 1.8 GPa or more:

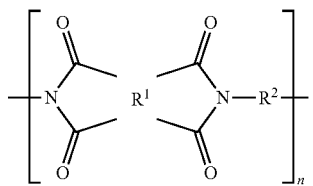

General Formula (1)

where $R^2$ is a tetravalent group that is a tetracarboxylic acid residue containing an aromatic ring or aliphatic ring; $R^2$ is a divalent group that is a diamine residue; 10 mol % to 50 mol % of total $R^2$s are diamine residues each containing one or two silicon atoms in a main chain thereof, and 50 mol % to 90 mol % of total $R^2$s are diamine residues each containing no silicon atom and containing an aromatic ring or aliphatic ring; and n is a number of repeating units.

The polyimide film according to the disclosed embodiments comprises the polyimide containing the specific structure in which a tetracarboxylic acid residue containing an aromatic ring or aliphatic ring is contained and, for the diamine residues, the content of the diamine residues each containing one or two silicon atoms in the main chain thereof, is 10 mol % to 50 mol %, and the content of the diamine residues each containing no silicon atom and containing an aromatic ring or aliphatic ring, is 50 mol % to 90 mol %. Also, the polyimide film according to the disclosed embodiments has the above-mentioned total light transmittance, yellowness index, glass transition temperature, and tensile elastic modulus. Therefore, a resin film with increased flex resistance and enough surface hardness as a protection film, can be provided.

The reason is presumed as follows.

Out of resins, the inventors of the disclosed embodiments focused attention on polyimide. Due to its chemical structure, polyimide is known to have excellent heat resistance. For polyimide film, it is known that molecular chain arrangement inside thereof forms a certain ordered structure. Therefore, polyimide film is considered to show excellent results in restorability when it is repeatedly bent and unbent with a constant period, at room temperature.

However, a resin composed of a conventional transparent polyimide is, even if it shows excellent results in a test in which the resin film is repeatedly bent and unbent with a constant period, problematic in that after the resin film is kept bent for a long period of time, the resin film obtains bending tendency, has difficulty in returning to flatness, and becomes inferior in static flex resistance. It is presumed that since the resin film was kept bent for a long period of time, plastic deformation was caused to the resin film by a tensile stress continuously applied to the outer periphery of the bent part, whereby it is difficult for the resin film to be restored even after the bending force is removed.

In particular, the reason is presumed as follows.

In film bending, tension is applied to the outer periphery of the bent part of the film, and compression force is applied to the inner periphery of the bent part. In film bending as shown in FIG. 1, the maximum stress (σ) at a part at which the applied stress is maximum (the maximum stress part) is represented by the following formula (1):

$$\sigma = \frac{E \times y}{\frac{\phi}{2} - y} = \frac{E \times d}{\phi - d} \qquad \text{Formula (1)}$$

where E is elastic modulus; y is the maximum distance value from a neutral axis (a core axis around which the film is bent) (in FIG. 1, half of film thickness d); φ is curvature (test width); and d is film thickness.

As shown by the formula (1), the maximum stress (σ) is proportional to the elastic modulus and the film thickness and is inversely proportional to a value obtained by subtracting the film thickness from the curvature. Therefore, as the elastic modulus of the film increases, a stress applied to the film when bending, also increases and leads to deformation. Even in the case of a resin film, as the elastic modulus increases, the film restorability after bending deteriorates, and the flex resistance tends to be poor. On the other hand, by increasing the elastic modulus of the resin film, the surface hardness has a tendency to increase. As will be shown in Comparative Example 3, for a polyimide film with a large elastic modulus, although the surface hardness increases, the flex resistance deteriorates. As just described, the flex resistance and surface hardness of the resin film are considered to be conflicting properties.

Substrates and surface materials for flexible display are required to have not only resistance to repeated bending, but also functions to prevent surface damage and damage to a tough sensor or display panel disposed thereunder. As long as the surface material is a material with a higher elastic modulus (e.g., glass), when an impact is applied to the display surface, the surface material can better diffuse the impact in the plane direction and reduce the locally concentrated impact. As a result, it can prevent damage to the display panel. The same applies to flexible displays, and the display panel protection function works better as the elastic modulus of the surface material increases. On the other hand, when the elastic modulus is low, the impact may be reduced by deformation of the surface material itself. However, a hollow is formed by the deformation and fixed, whereby the smoothness of the display surface is largely reduced, and the appearance of the display surface is easily deteriorated.

For the polyimide film of Patent Document 4, Patent Document 4 describes as follows: by introducing a silicone component containing three or more silicon atoms in the polyimide film, the polyimide film obtains a glass transition temperature equal to or lower than the freezing point, and a residual stress generated between the polyimide film and an inorganic film is decreased. However, as will be shown in Comparative Example 2, the polyimide film produced by introducing therein the silicone component containing three or more silicon atoms, has the following problem: due to having low glass transition temperature, the elastic modulus is insufficient at room temperature, and the surface hardness is low; therefore, the polyimide film is easily scratched or transmits impact to a light-emitting panel or circuit, and it insufficiently functions as a protection film.

For the polyimide film of Patent Document 5, Patent Document 5 describes that the polyimide film has high folding endurance. However, as will be shown in Comparative Example 4, a polyimide film produced by introducing silicone diamine (containing about 9 or 10 silicon atoms) therein, which corresponds to Example in Patent Document 5, has the following problem: the elastic modulus is insufficient at room temperature, and the surface hardness is low; therefore, the polyimide film is easily scratched and insufficiently functions as a protection film.

For the above reasons, there is a demand for a resin film having flex resistance and enough surface hardness as a protection film. However, as described above, the flex resistance and surface hardness of a resin film are considered to be conflicting properties, and keeping the surface hardness with increasing the flex resistance, is difficult. A stress generated on a film surface can be reduced by introducing a silicone component. However, if a silicone having a large molecular weight is used with an overemphasis on the stress reducing effect, the whole film becomes too soft, and it is difficult for the film to achieve both flex resistance and surface hardness.

Meanwhile, the inventors of the disclosed embodiments found that by use of a polyimide in which certain amounts of flexible molecular frameworks containing one or two silicon atoms in the main chain and having a small molecular amount are introduced between molecular frameworks containing an aromatic ring or aliphatic ring, a polyimide film that can control the glass transition temperature while keeping the elastic modulus derived from the molecular frameworks containing an aromatic ring or aliphatic ring, can be produced. The polyimide film of the disclosed embodiments is a polyimide film that is provided with enough surface hardness as a protection film and increased flex resistance by introducing, between the molecular frameworks containing an aromatic ring or aliphatic ring, the certain amounts of the flexible molecular frameworks containing one or two silicon atoms in the main chain. As will be shown by the results of dynamic and static bending tests described under "Examples", the polyimide film of the disclosed embodiments is such a polyimide film, that not only the restorability after being repeatedly bent (i.e., dynamic flex resistance) but also the restorability after being kept bent for a long period of time (i.e., static flex resistance) are increased. In the disclosed embodiments, the reason for such an increase in flex resistance is presumed as follows: by the introduction of the certain amounts of the specific flexible molecular frameworks containing the short main chain in the rigid molecular frameworks, stress reduction by molecular motion is allowed, and a stress applied to the film when bending can be reduced, therefore. It is also thought that by limiting the flexible molecular framework to a diamine residue containing one or two silicon atoms so that the flexible moiety of the main chain is shortened, and introducing the certain amounts of the flexible molecular frameworks containing the short main chain in the rigid molecular frameworks, the polyimide film of the disclosed embodiments can suppress a decrease in elastic modulus at room temperature, and it can keep sufficient surface hardness as a protection film at room temperature.

Hereinafter, the polyimide film of the disclosed embodiments will be described in detail.

The polyimide film of the disclosed embodiments is the polyimide film comprising the polyimide containing the structure represented by the general formula (1), and having the above-specified properties. The polyimide film may further contain other components or other structures, as long as the effect of the disclosed embodiments are not impaired.

1. Polyimide

A polyimide is obtained by reacting a tetracarboxylic acid component with a diamine component. It is preferable that polyamide acid is obtained by polymerization of the tetracarboxylic acid component and the diamine component and imidized. The polyamide acid may be imidized by thermal imidization or chemical imidization. The polyimide can be produced by a method using both thermal imidization and chemical imidization.

The polyimide used in the disclosed embodiments comprises the polyimide containing the structure represented by the general formula (1):

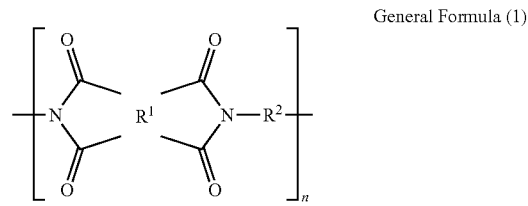

General Formula (1)

where $R^2$ is a tetravalent group that is a tetracarboxylic acid residue containing an aromatic ring or aliphatic ring; $R^2$ is a divalent group that is a diamine residue; 10 mol % to 50 mol % of total $R^2$s are diamine residues each containing one or two silicon atoms in a main chain thereof, and 50 mol % to 90 mol % of total $R^2$s are diamine residues each containing no silicon atom and containing an aromatic ring or aliphatic ring; and n is a number of repeating units.

The tetracarboxylic acid residue means a residue obtained by removing four carboxyl groups from tetracarboxylic acid, and it represents the same structure as a residue obtained by removing an acid dianhydride structure from tetracarboxylic dianhydride.

Also, the diamine residue means a residue obtained by removing two amino groups from diamine.

The tetracarboxylic acid residue, which is $R^1$ in the general formula (1), can be a residue obtained by removing an acid dianhydride structure from a tetracarboxylic dianhydride containing an aromatic ring, or it can be a residue obtained by removing an acid dianhydride structure from a tetracarboxylic dianhydride containing an aliphatic ring.

As the tetracarboxylic dianhydride containing an aromatic ring, examples include, but are not limited to, pyromellitic dianhydride, 3,3',4,4'-benzophenonetetracarboxylic dianhydride, 2,2',3,3'-benzophenonetetracarboxylic dianhydride, 3,3',4,4'-biphenyltetracarboxylic dianhydride, 2,2',3,3'-biphenyltetracarboxylic dianhydride, 2,2-bis(3,4-dicarboxyphenyl)propane dianhydride, 2,2-bis(2,3-dicarboxyphenyl)propane dianhydride, bis(3,4-dicarboxyphenyl)ether dianhydride, bis(3,4-dicarboxyphenyl)sulfone dianhydride, 1,1-bis(2,3-dicarboxyphenyl)ethane dianhydride, bis(2,3-dicarboxyphenyl)methane dianhydride, bis(3,4-dicarboxyphenyl)methane dianhydride, 2,2-bis(3,4-dicarboxyphenyl)-1,1,1,3,3,3-hexafluoropropane dianhydride, 2,2-bis(2,3-dicarboxyphenyl)-1,1,1,3,3,3-hexafluoropropane dianhydride, 1,3-bis[(3,4-dicarboxy)benzoyl]benzene dianhydride, 1,4-bis[(3,4-dicarboxy)benzoyl]benzene dianhydride, 2,2-bis{4-[4-(1,2-dicarboxy)phenoxy]phenyl}propane dianhydride, 2,2-bis{4-[3-(1,2-dicarboxy)phenoxy]phenyl}propane dianhydride, bis{4-[4-(1,2-dicarboxy)phenoxy]phenyl}ketone dianhydride, bis{4-[3-(1,2-dicarboxy)phenoxy]phenyl}ketone dianhydride, 4,4'-bis[4-(1,2-dicarboxy)phenoxy]biphenyl dianhydride, 4,4'-bis[3-(1,2-dicarboxy)phenoxy]biphenyl dianhydride, bis{4-[4-(1,2-dicarboxy)phenoxy]phenyl}ketone dianhydride, bis{4-[3-(1,2-dicarboxy)phenoxy]phenyl}ketone dianhydride, bis{4-[4-(1,2-dicarboxy)phenoxy]phenyl}sulfone dianhydride, bis{4-[3-(1,2-dicarboxy)phenoxy]phenyl}sulfone dianhydride, bis{4-[4-(1,2-dicarboxy)phenoxy]phenyl}sulfide dianhydride, bis{4-[3-(1,2-dicarboxy)phenoxy]phenyl}sulfide dianhydride, 4,4'-(hexafluoroisopropylidene)diphthalic anhydride, 3,4'-(hexafluoroisopropylidene)diphthalic anhydride, 3,3'-(hexafluoroisopropylidene)diphthalic anhydride, 4,4'-oxydiphthalic anhydride, 3,4'-oxydiphthalic anhydride, 2,3,6,7-naphthalenetetracarboxylic dianhydride, 1,4,5,8-naphthalenetetracarboxylic dianhydride, 1,2,5,6-naphthalenetetracarboxylic dianhydride, 1,2,3,4-benzenetetracarboxylic dianhydride, 3,4,9,10-perylenetetracarboxylic dianhydride, 2,3,6,7-anthracenetetracarboxylic dianhydride, and 1,2,7,8-phenanthrenetetracarboxylic dianhydride.

As the tetracarboxylic dianhydride containing an aliphatic ring, examples include, but are not limited to, cyclohexanetetracarboxylic dianhydride, cyclopentanetetracarboxylic dianhydride, dicyclohexane-3,4,3',4'-tetracarboxylic dianhydride, and cyclobutanetetracarboxylic dianhydride.

They may be used alone or in combination of two or more kinds.

The diamine residue containing one or two silicon atoms in the main chain thereof, which is $R^2$ in the general formula (1), can be a residue that is obtained by removing two amino groups from a diamine containing one or two silicon atoms in a main chain thereof. In the polyimide film of the disclosed embodiments, the certain amounts of the flexible molecular frameworks containing one or two silicon atoms in the main chain thereof, are introduced in the molecular frameworks containing, as a main component, an aromatic ring or aliphatic ring. Therefore, the polyimide film of the disclosed embodiments is likely to be a polyimide film which can achieve both flex resistance and surface hardness as described above, and which can easily suppress orientation and, as described above, can reduce birefringence index.

As the diamine containing one silicon atom in the main chain thereof, examples include, but are not limited to, a diamine represented by the following general formula (A). As the diamine containing two silicon atoms in the main chain thereof, examples include, but are not limited to, a diamine represented by the following general formula (B).

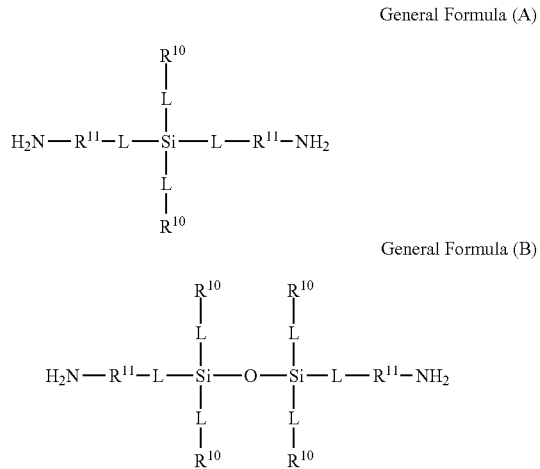

General Formula (A)

General Formula (B)

where each L is independently a direct bond or —O— bond; each $R^{10}$ is independently a monovalent hydrocarbon group containing to 20 carbon atoms, optionally containing a substituent group and optionally containing an oxygen atom or nitrogen atom; and each $R^{11}$ is independently a divalent hydrocarbon group containing 1 to 20 carbon atoms, optionally containing a substituent group and optionally containing an oxygen atom or nitrogen atom.

The monovalent hydrocarbon group represented by $R^{10}$, may be any one of an alkyl group, an aryl group, and a combination thereof, each containing 1 to 20 carbon atoms. The alkyl group may be a straight-chain alkyl group, a branched-chain alkyl group or a cyclic alkyl group, and it may be a combination of a straight- or branched-chain alkyl group and a cyclic alkyl group.

The alkyl group containing 1 to 20 carbon atoms is preferably an alkyl group containing 1 to 10 carbon atoms. As the alkyl group, examples include, but are not limited to, a methyl group, an ethyl group, a propyl group, an isopropyl group, a butyl group, an isobutyl group, a t-butyl group, a pentyl group and a hexyl group. The cyclic alkyl group is preferably a cycloalkyl group containing 3 to 10 carbon atoms. As the cycloalkyl group, examples include, but are not limited to, a cyclopentyl group and a cyclohexyl group. The aryl group is preferably an aryl group containing 6 to 12 carbon atoms. As the aryl group, examples include, but are not limited to, a phenyl group, a tolyl group and a naphthyl group. Also, the monovalent hydrocarbon group represented by $R^{10}$ may be an aralkyl group. As the aralkyl group, examples include, but are not limited to, a benzyl group, a phenylethyl group and a phenylpropyl group.

As the hydrocarbon group optionally containing an oxygen atom or nitrogen atom, examples include, but are not limited to, a group in which the below-described divalent hydrocarbon group is bound to the monovalent hydrocarbon group by at least one of an ether bond, a carbonyl bond, an ester bond, an amide bond and an imino bond (—NH—).

The substituent group the monovalent hydrocarbon group represented by $R^{10}$ optionally contains, is not particularly limited, to the extent that does not impair the effects of the disclosed embodiments. As the substituent group, examples include, but are not limited to, halogen atoms such as a fluorine atom and a chlorine atom, and a hydroxyl group.

From the viewpoint of achieving both surface hardness and an increase in flex resistance, the monovalent hydrocarbon group represented by $R^{10}$ is preferably an alkyl group containing 1 to 3 carbon atoms, or an aryl group containing 6 to 10 carbon atoms. The alkyl group containing 1 to 3 carbon atoms is more preferably a methyl group. The aryl group containing 6 to 10 carbon atoms is more preferably a phenyl group.

The divalent hydrocarbon group represented by $R^{11}$ may be any one of an alkylene group, an arylene group, and a combination thereof, each containing 1 to 20 carbon atoms. The alkylene group may be a straight-chain alkylene group, a branched-chain alkylene group or a cyclic alkylene group, and it may be a combination of a straight- or branched-chain alkylene group and a cyclic alkylene group.

The alkylene group containing 1 to 20 carbon atoms is preferably an alkylene group containing 1 to 10 carbon atoms. As the alkylene group, examples include, but are not limited to, a straight- or branched-chain alkylene group such as a methylene group, an ethylene group, various kinds of propylene groups, various kinds of butylene groups, a cyclic alkylene group such as a cyclohexylene group, and combinations thereof.

The arylene group is preferably an arylene group containing 6 to 12 carbon atoms. As the arylene group, examples include, but are not limited to, a phenylene group, a biphenylene group, and a naphthylene group. The arylene group may further contain the below-described substituent group bound to an aromatic ring by substitution.

The divalent hydrocarbon group optionally containing an oxygen atom or nitrogen atom may be a group in which the above-mentioned divalent hydrocarbon groups are bound by any one of an ether bond, a carbonyl bond, an ester bond, an amide bond and an imino bond (—NH—).

The substituent group the divalent hydrocarbon group represented by $R^{11}$ optionally contains may be the same as the substituent group the monovalent hydrocarbon group represented by $R^{10}$ optionally contains.

From the viewpoint of achieving both surface hardness and an increase in flex resistance, the divalent hydrocarbon group represented by $R^{11}$ is preferably an alkylene group containing 1 to 6 carbon atoms or an arylene group containing 6 to 10 carbon atoms, and more preferably an alkylene group containing 2 to 4 carbon atoms.

From the viewpoint of achieving both surface hardness and an increase in flex resistance, the molecular weight of the diamine residue containing one or two silicon atoms in the main chain thereof, is preferably 1000 or less, more preferably 800 or less, still more preferably 500 or less, and particularly preferably 300 or less.

The diamine residue containing one or two silicon atoms in the main chain thereof, may be one kind of diamine residue containing one or two silicon atoms in a main chain thereof, or it may be a combination of two or more kinds of diamine residues each containing one or two silicon atoms in a main chain thereof.

The diamine residue containing no silicon atom and containing an aromatic ring, which is $R^2$ in the general formula (1), can be a residue obtained by removing two amino groups from a diamine containing no silicon atom and containing an aromatic ring.

As the diamine containing an aromatic ring, examples include, but are not limited to, p-phenylenediamine, m-phenylenediamine, o-phenylenediamine, 3,3'-diaminodiphenylether, 3,4'-diaminodiphenylether, 4,4'-diaminodiphenylether, 3,3'-diaminodiphenylsulfide, 3,4'-diaminodiphenylsulfide, 4,4'-diaminodiphenylsulfide, 3,3'-diaminodiphenylsulfone, 3,4'-diaminodiphenylsulfone, 4,4'-diaminodiphenylsulfone, 3,3'-diaminobenzophenone, 4,4'-diaminobenzophenone, 3,4'-diaminobenzophenone, 4,4'-diaminobenzanilide, 3,3'-diaminodiphenylmethane, 4,4'-diaminodiphenylmethane, 3,4'-diaminodiphenylmethane, 2,2-di(3-aminophenyl)propane, 2,2-di(4-aminophenyl)propane, 2-(3-aminophenyl)-2-(4-aminophenyl)propane, 2,2-di(3-aminophenyl)-1,1,1,3,3,3-hexafluoropropane, 2,2-di(4-aminophenyl)-1,1,1,3,3,3-hexafluoropropane, 2-(3-aminophenyl)-2-(4-aminophenyl)-1,1,1,3,3,3-hexafluoropropane, 1,1-di(3-aminophenyl)-1-phenylethane, 1,1-di(4-aminophenyl)-1-phenylethane, 1-(3-aminophenyl)-1-(4-aminophenyl)-1-phenylethane, 1,3-bis(3-aminophenoxy)benzene, 1,3-bis(4-aminophenoxy)benzene, 1,4-bis(3-aminophenoxy)benzene, 1,4-bis(4-aminophenoxy)benzene, 1,3-bis(3-aminobenzoyl)benzene, 1,3-bis(4-aminobenzoyl)benzene, 1,4-bis(3-aminobenzoyl)benzene, 1,4-bis(4-aminobenzoyl)benzene, 1,3-bis(3-amino-α,α-dimethylbenzyl)benzene, 1,3-bis(4-amino-α,α-dimethylbenzyl)benzene, 1,4-bis(3-amino-α,α-dimethylbenzyl)benzene, 1,4-bis(4-amino-α,α-dimethylbenzyl)benzene, 1,3-bis(3-amino-α,α-ditrifluoromethylbenzyl)benzene, 1,3-bis(4-amino-α,α-ditrifluoromethylbenzyl)benzene, 1,4-bis(3-amino-α,α-ditrifluoromethylbenzyl)benzene, 1,4-bis(4-amino-α,α-ditrifluoromethylbenzyl)benzene, 2,6-bis(3-aminophenoxy)benzonitrile, 2,6-bis(3-aminophenoxy)pyridine, N,N'-bis(4-aminophenyl)terephthalamide, 9,9-bis(4-aminophenyl)fluorene, 2,2'-dimethyl-4,4'-diaminobiphenyl, 2,2'-ditrifluoromethyl-4,4'-diaminobiphenyl, 3,3'-dichloro-4,4'-diaminobiphenyl, 3,3'-dimethoxy-4,4'-diaminobiphenyl, 3,3'-dimethyl-4,4'-diaminobiphenyl, 4,4'-bis(3-aminophenoxy)biphenyl, 4,4'-bis(4-aminophenoxy)biphenyl, bis[4-(3-aminophenoxy)phenyl]ketone, bis[4-(4-aminophenoxy)phenyl]ketone, bis[4-(3-aminophenoxy)phenyl]sulfide, bis[4-(4-aminophenoxy)phenyl]sulfide, bis[4-(3-aminophenoxy)phenyl]sulfone, bis[4-(4-aminophenoxy)phenyl]sulfone, bis[4-(3-aminophenoxy)phenyl]ether, bis[4-(4-aminophenoxy)phenyl]ether, 2,2-bis[4-(3-aminophenoxy)phenyl]propane, 2,2-bis[4-(4-aminophenoxy)phenyl]propane, 2,2-bis[3-(3-aminophenoxy)phenyl]-1,1,1,3,3,3-hexafluoropropane, 2,2-bis[4-(4-aminophenoxy)phenyl]-1,1,1,3,3,3-hexafluoropropane, 1,3-bis[4-(3-aminophenoxy)benzoyl]benzene, 1,3-bis[4-(4-aminophenoxy)benzoyl]benzene, 1,4-bis[4-(3-aminophenoxy)benzoyl]benzene, 1,4-bis[4-(4-aminophenoxy)benzoyl]benzene, 1,3-bis[4-(3-aminophenoxy)-α,α-dimethylbenzyl]benzene, 1,3-bis[4-(4-aminophenoxy)-α,α-dimethylbenzyl]benzene, 1,4-bis[4-(3-aminophenoxy)-α,α-dimethylbenzyl]benzene, 1,4-bis[4-(4-aminophenoxy)-α,α-dimethylbenzyl]benzene, 4,4'-bis[4-(4-aminophenoxy)benzoyl]diphenyl ether, 4,4'-bis[4-(4-amino-α,α-dimethylbenzyl)phenoxy]benzophenone, 4,4'-bis[4-(4-amino-α,α-dimethylbenzyl)phenoxy]diphenylsulfone, 4,4'-bis[4-(4-aminophenoxy)phenoxy]diphenylsulfone, 3,3'-diamino-4,4'-diphenoxybenzophenone, 3,3'-diamino-4,4'-dibiphenoxybenzophenone, 3,3'-diamino-4-phenoxybenzophenone, 3,3'-diamino-4-biphenoxybenzophenone, 6,6'-bis(3-aminophenoxy)-3,3,3',3'-tetramethyl-1,1'-spirobiindan, 6,6'-bis(4-aminophenoxy)-3,3,3',3'-tetramethyl-1,1'-spirobiindan, etc., and diamines obtained by substituting at least one hydrogen atom on an aromatic ring of each of the above-mentioned diamines with a substituent group selected from a fluoro group, a methyl group, a methoxy group, a trifluoromethyl group or a trifluoromethoxy group.

They may be used alone or in combination of two or more kinds.

The diamine residue containing no silicon atom and containing an aliphatic ring, which is $R^2$ in the general formula (1), can be a residue obtained by removing two amino groups from a diamine containing an aliphatic ring.

As the diamine containing an aliphatic ring, examples include, but are not limited to, trans-cyclohexanediamine, trans-1,4-bismethylenecyclohexane diamine, 2,6-bis(aminomethyl)bicyclo[2,2,1]heptane and 2,5-bis(aminomethyl)bicyclo[2,2,1]heptane.

They may be used alone or in combination of two or more kinds.

For the polyimide film of the disclosed embodiments, $R^2$ in the general formula (1) is such that 10 mol % to 50 mol % of total $R^2$s are the diamine residues each containing one or two silicon atoms in the main chain thereof, and 50 mol % to 90 mol % of total $R^2$s are the diamine residues each containing no silicon atom and containing an aromatic ring or aliphatic ring. Therefore, the polyimide film of the disclosed embodiments can obtain an increase in flex resistance and enough surface hardness as a protection film. For $R^2$ in the general formula (1), from the viewpoint of increasing adhesion to an organic film in the production of a laminate composed of the polyimide film of the disclosed embodiments and an organic film (such as the below-described hard coat layer), it is preferable that 15 mol % or more of total $R^2$s are the diamine residues each containing one or two silicon atoms in the main chain thereof, and it is more preferable that 20 mol % or more of total $R^2$s are the diamine residues each containing one or two silicon atoms in the main chain thereof. On the other hand, for $R^2$ in the general formula (1), from the viewpoint of increasing surface hardness and light transmittability, it is preferable that 45 mol % or less of total $R^2$s are the diamine residues each containing one or two silicon atoms in the main chain thereof, and it is more preferable that 40 mol % or less of total $R^2$s are the diamine residues each containing one or two silicon atoms in the main chain thereof.

As long as 10 mol % to 50 mol % of total $R^2$s are the diamine residues each containing one or two silicon atoms in the main chain thereof, and 50 mol % to 90 mol % of total $R^2$s are the diamine residues each containing no silicon atom and containing an aromatic ring or aliphatic ring, $R^2$s may contain diamine residues that are different from the diamine residues each containing one or two silicon atoms in the main chain thereof and from the diamine residues each containing no silicon atom and containing an aromatic ring or aliphatic ring. The different diamine residues preferably account for 10 mol % or less of total $R^2$s, more preferably 5 mol % or less, still more preferably 3 mol % or less, and particularly preferably 1 mol % or less. As the different diamine residues, examples include, but are not limited to, diamine residues each containing no silicon atom and containing no aromatic ring or aliphatic ring. From the viewpoint of achieving an increase in tensile elastic modulus and an increase in surface hardness, it is preferable that $R^2$s do not contain a diamine residue containing three or more silicon atoms in a main chain thereof.

It is particularly preferable that 10 mol % to 50 mol % of total $R^2$s are the diamine residues each containing one or two silicon atoms in the main chain thereof, and the remainder (100%–x %) obtained by deducting the amount (x mol %) of the diamine residues each containing one or two silicon atoms in the main chain thereof from the total amount (100 mol %) of $R^2$s, the remainder being in a range of from 50 mol % to 90 mol %, is the diamine residues each containing no silicon atom and containing an aromatic ring or aliphatic ring.

From the viewpoint of increasing light transmittability and increasing surface hardness, the polyimide containing the structure represented by the general formula (1) is particularly preferably a polyimide that contains an aromatic ring and at least one selected from the group consisting of (i) a fluorine atom, (ii) an aliphatic ring and (iii) a structure that aromatic rings are linked by a sulfonyl group or an alkylene group to which fluorine is optionally bound by substitution. Since the polyimide containing the structure represented by the general formula (1) contains at least one selected from the group consisting of the tetracarboxylic acid residue containing an aromatic ring and the diamine residue containing an aromatic ring, the molecular framework becomes rigid; the orientation is increased; and the surface hardness is increased. However, since the absorption wavelength of the rigid aromatic ring structure has a tendency to extend to longer wavelength side, and the transmittance in the visible light region shows a tendency to decrease.

When the polyimide contains (i) a fluorine atom, electrons in the polyimide framework can enter a state where charge transfer is less likely to occur. Therefore, the light transmittability of the polyimide is increased.

When the polyimide contains (ii) an aliphatic ring, pi-electron conjugation in the polyimide framework is cut and, as a result, charge transfer in the framework can be inhibited. Therefore, the light transmittability of the polyimide is increased.

When the polyimide contains (iii) a structure that aromatic rings are linked by a sulfonyl group or an alkylene group to which fluorine is optionally bound by substitution, pi-electron conjugation in the polyimide framework is cut and, as a result, charge transfer in the framework can be inhibited. Therefore, the light transmittability of the polyimide is increased.

The polyimide containing the structure represented by the general formula (1) is particularly preferably a polyimide containing a fluorine atom, from the viewpoint of increasing light transmittability and increasing surface hardness.

For the content ratio of the fluorine atoms, the ratio (F/C) between the number of fluorine atoms (F) and the number of carbon atoms (C), which is obtained by measuring the polyimide surface by X-ray photoelectron spectroscopy, is preferably 0.01 or more, and more preferably 0.05 or more. On the other hand, when the content ratio of the fluorine atoms is too high, the original heat resistance of the polyimide may decrease. Therefore, the ratio (F/C) between the number of fluorine atoms (F) and the number of carbon atoms (C) is preferably 1 or less, and more preferably 0.8 or less.

The ratio measured by X-ray photoelectron spectroscopy (XPS) can be obtained from the values (atom %) of the fluorine and carbon atoms measured with the use of an X-ray photoelectron spectrometer (such as "THETA PROBE" manufactured by Thermo Scientific).

For the polyimide containing the structure represented by the general formula (1), from the viewpoint of increasing surface hardness, the total of the tetracarboxylic acid residues each containing an aromatic ring and the diamine residues each containing an aromatic ring is preferably 50 mol % or more, more preferably 60 mol % or more, and still more preferably 75 mol % or more, when the total of R's and $R^2$s in the general formula (1) is determined as 100 mol %.

For the polyimide containing the structure represented by the general formula (1), from the viewpoint of increasing surface hardness and light transmittability, it is preferable that at least one of the tetracarboxylic acid residue, which is $R^1$, and the diamine residue containing no silicon atom and containing an aromatic ring or aliphatic ring, which is $R^2$, contains an aromatic ring and a fluorine atom. It is more preferable that both the tetracarboxylic acid residue, which is $R^1$, and the diamine residue containing no silicon atom and containing an aromatic ring or aliphatic ring, which is $R^2$, contain an aromatic ring and a fluorine atom.

For the polyimide containing the structure represented by the general formula (1), from the viewpoint of increasing surface hardness and light transmittability, it is preferable that the total of tetracarboxylic acid residues each containing an aromatic ring and a fluorine atom and diamine residues each containing an aromatic ring and a fluorine atom, is preferably 50 mol % or more, more preferably 60 mol % or more, and still more preferably 75 mol % or more, when the total of $R^1$s and $R^2$s in general formula (1) is determined as 100 mol %.

From the viewpoint of increasing light transmittability and increasing surface hardness, as the polyimide containing the structure represented by the general formula (1), a polyimide in which 50% or more of hydrogen atoms bound to carbon atoms contained in the polyimide, are hydrogen atoms directly bound to the aromatic ring, is preferably used. The percentage of (the number of) the hydrogen atoms directly bound to the aromatic ring among (the number of) all of the hydrogen atoms bound to the carbon atoms contained in the polyimide, is more preferably 60% or more, and still more preferably 70% or more.

Also, the polyimide in which 50% or more of the hydrogen atoms bound to the carbon atoms contained in the polyimide, are hydrogen atoms directly bound to the aromatic ring, is preferred from the following viewpoint: in this case, the polyimide shows small changes in optical properties, especially, total light transmittance and yellowness index (YI) value, even when it is subjected to a step of heating in air or stretching at, for example, 200° C. or more. It is presumed that in the case of the polyimide in which 50% or more of the hydrogen atoms bound to the carbon atoms contained in the polyimide, are hydrogen atoms directly bound to the aromatic ring, the polyimide has low reactivity with oxygen, and, therefore, the chemical structure of the polyimide is less likely to change. A polyimide film is, due to its high heat resistance, often used in devices that requires a working process involving heating. However, in the case of the polyimide in which 50% or more of the hydrogen atoms bound to the carbon atoms contained in the polyimide, are hydrogen atoms directly bound to the aromatic ring, it is not needed to carry out the post-processes in an inert atmosphere for maintaining transparency. Therefore, the polyimide has such an advantage that facility costs and costs required for atmosphere control can be reduced.

The percentage of (the number of) the hydrogen atoms directly bound to the aromatic ring among (the number of) all of the hydrogen atoms bound to the carbon atoms contained in the polyimide, can be obtained by measuring a decomposition product of the polyimide by high-performance liquid chromatography, a gas chromatography mass spectrometer and NMR. For example, a sample is decomposed in an alkaline aqueous solution or supercritical methanol, and a decomposition product thus obtained is separated by high-performance liquid chromatography. Each separated peak is qualitatively analyzed by a gas chromatography mass spectrometer and NMR, and quantitatively analyzed by the high-performance liquid chromatography, thereby obtaining the percentage of (the number of) the hydrogen atoms directly bound to the aromatic ring, among (the number of) all of the hydrogen atoms contained in the polyimide.

For the polyimide containing the structure represented by the general formula (1), from the viewpoint of flex resistance and surface hardness, the content ratio (mass %) of the silicon atom in the polyimide is preferably 0.7 mass % or more and 6.5 mass % or less, more preferably 0.7 mass % or more and 5.5 mass % or less, and still more preferably 0.7 mass % or more and 4.2 mass % or less.

In the polyimide production, the content ratio (mass %) of the silicon atom in the polyimide can be obtained from the molecular weight of raw materials. Also, the content ratio (mass %) of the silicon atom in the polyimide can be obtained by measuring a decomposition product of the polyimide obtained in the same manner as above, using high-performance liquid chromatography, a gas chromatography mass spectrometer, NMR, elemental analysis, XPS/ESCA and TOF-SIMS.

For the polyimide containing the structure represented by the general formula (1), from the viewpoint of light transmittability and from the viewpoint of flex resistance and surface hardness, $R^1$ in the general formula (1) is preferably at least one tetravalent group selected from the group consisting of a cyclohexanetetracarboxylic dianhydride residue, a cyclopentanetetracarboxylic dianhydride residue, a dicyclohexane-3,4,3',4'-tetracarboxylic dianhydride residue, a cyclobutanetetracarboxylic dianhydride residue, a pyromellitic dianhydride residue, a 3,3',4,4'-biphenyltetracarboxylic dianhydride residue, a 2,2',3,3'-biphenyltetracarboxylic dianhydride residue, a 4,4'-(hexafluoroisopropylidene)diphthalic anhydride residue, a 3,4'-(hexafluoroisopropylidene)diphthalic anhydride residue, a 3,3'-(hexafluoroisopropylidene)diphthalic anhydride residue, a 4,4'-oxydiphthalic anhydride residue, and a 3,4'-oxydiphthalic anhydride residue.

The total content of the preferable residues in $R^1$ is preferably 50 mol % or more, more preferably 70 mol % or more, and still more preferably 90 mol % or more.

Especially from the viewpoint of a good balance of light transmittability and surface hardness, $R^1$ in the general formula (1) is more preferably at least one tetravalent group selected from the group consisting of a 4,4'-(hexafluoroisopropylidene)diphthalic anhydride residue, a 3,4'-(hexafluoroisopropylidene)diphthalic anhydride residue, a 3,3'-(hexafluoroisopropylidene)diphthalic anhydride residue, a 4,4'-oxydiphthalic anhydride residue, and a 3,4'-oxydiphthalic anhydride residue.

It is also preferable to use, as $R^1$ in the general formula (1), a mixture of a group of tetracarboxylic acid residues suited for increasing rigidity (Group A) such as at least one selected from the group consisting of a pyromellitic dianhydride residue, a 3,3',4,4'-biphenyltetracarboxylic dianhydride residue, and a 2,2',3,3'-biphenyltetracarboxylic dianhydride residue, with a group of tetracarboxylic acid residues suited for increasing light transmittability (Group B) such as at least one selected from the group consisting of a cyclohexanetetracarboxylic dianhydride residue, a cyclopentanetetracarboxylic dianhydride residue, a dicyclohexane-3,4,3',4'-tetracarboxylic dianhydride residue, a cyclobutanetetracarboxylic dianhydride residue, a 4,4'-(hexafluoroisopropylidene)diphthalic anhydride residue, a 3,4'-(hexafluoroisopropylidene)diphthalic anhydride residue, a 3,3'-(hexafluoroisopropylidene)diphthalic anhydride residue, a 4,4'-oxydiphthalic anhydride residue, and a 3,4'-oxydiphthalic anhydride residue. In this case, for the content ratio of the group of the tetracarboxylic acid residues suited for increasing rigidity (Group A) and the group of the tetracarboxylic acid residues suited for increasing light transmittability (Group B), the group of the tetracarboxylic acid residues suited for increasing rigidity (Group A) is preferably 0.05 mol or more and 9 mol or less, more preferably 0.1 mol or more and 5 mol or less, and still more preferably 0.3 mol or more and 4 mol or less, with respect to 1 mol of the group of the tetracarboxylic acid residues suited for increasing light transmittability (Group B).

From the viewpoint of increasing surface hardness and light transmittability, it is particularly preferable to use, as the Group B, at least one of a 4,4'-(hexafluoroisopropylidene)diphthalic anhydride residue containing a fluorine atom and a 3,4'-(hexafluoroisopropylidene)diphthalic anhydride residue containing a fluorine atom.

From the viewpoint of light transmittability and the viewpoint of flex resistance and surface hardness, for the polyimide containing the structure represented by the general formula (1), the diamine residue containing no silicon atom and containing an aromatic ring or aliphatic ring, which is $R^2$ in the general formula (1), is preferably at least one divalent group selected from the group consisting of a trans-cyclohexanediamine residue, a trans-1,4-bismethylenecyclohexane diamine residue, a 4,4'-diaminodiphenylsulfone residue, a 3,4'-diaminodiphenylsulfone residue, a 2,2-bis(4-aminophenyl)propane residue, a 2,2-bis(4-aminophenyl)hexafluoropropane residue, and a divalent group represented by the following general formula (2). From the viewpoint of achieving both light transmittability and surface hardness, the diamine residue containing no silicon atom and containing an aromatic ring or aliphatic ring, which is $R^2$ in the general formula (1), is more preferably at least one divalent group selected from the group consisting of a 4,4'-diaminodiphenylsulfone residue, a 3,4'-diaminodiphenylsulfone residue, 2,2-bis(4-aminophenyl)propane, a 2,2-bis(4-aminophenyl)hexafluoropropane residue, and a divalent group represented by the following general formula (2). The divalent group represented by the general formula (2) is more preferably a divalent group in which $R^3$ and $R^4$ are perfluoroalkyl groups.

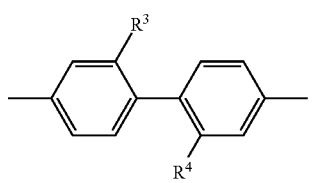

General Formula (2)

where each of $R^3$ and $R^4$ is independently a hydrogen atom, an alkyl group, or a perfluoroalkyl group.

For the polyimide containing the structure represented by the general formula (1), from the viewpoint of light transmittability and the viewpoint of flex resistance and surface hardness, the diamine residue containing one or two silicon atoms in the main chain thereof, which is $R^2$ in the general formula (1), is preferably a diamine residue containing two silicon atoms. From the viewpoint of availability and achieving both light transmittability and surface hardness, the diamine residue containing one or two silicon atoms in the main chain thereof, which is $R^2$ in the general formula (1), is more preferably a 1,3-bis(3-aminopropyl)tetramethyldisiloxane residue, 1,3-bis(4-aminobutyl)tetramethyldisiloxane, 1,3-bis(5-aminopentyl)tetramethyldisiloxane or the like.

In the structure represented by the general formula (1), n represents the number of repeating units and is 1 or more.

The number (n) of the repeating units of the polyimide, is not particularly limited and may be appropriately selected depending on the structure so that the below-described preferable glass transition temperature is shown.

The average number of the repeating units is generally from 10 to 2000, and more preferably from 15 to 1000.

The polyimide used in the disclosed embodiments can contain one or more kinds of polyimides containing the structure represented by the general formula (1).

For the polyimide used in the disclosed embodiments, a part thereof may contain a structure different from the structure represented by the general formula (1), as long as the effects of the disclosed embodiments are not impaired.

For the polyimide used in the disclosed embodiments, the structure represented by the general formula (1) is preferably 95% or more of the number of the all repeating units of the polyimide, more preferably 98% or more, and still more preferably 100%.

As the structure different from the structure represented by the general formula (1), examples include, but are not limited to, a polyamide structure and the case of containing a tetracarboxylic acid residue containing no aromatic ring or aliphatic ring.

As the polyamide structure that may be contained, examples include, but are not limited to, a polyamideimide structure containing a tricarboxylic acid residue such as trimellitic anhydride, and a polyamide structure containing a dicarboxylic acid residue such as terephthalic acid.

The polyimide used in the disclosed embodiments has a glass transition temperature in a temperature range of from 150° C. to 400° C. Since the glass transition temperature is 150° C. or more, excellent heat resistance is obtained. The glass transition temperature is preferably 200° C. or more. In addition, since the glass transition temperature is 400° C. or less, reduction in baking temperature can be obtained. The glass transition temperature is preferably 380° C. or less.

It is also preferable that the polyimide used in the disclosed embodiments does not have a peak in a temperature range of from −150° C. to 0° C. in a tan δ curve, whereby the surface hardness of the polyimide film at room temperature can be increased. The polyimide used in the disclosed embodiments may further have a peak in a temperature range of more than 0° C. and less than 150° C. in a tan δ curve.

The glass transition temperature of the polyimide used in the disclosed embodiments, can be measured in the same manner as the glass transition temperature of the below-described polyimide film.

2. Additive

The polyimide film of the disclosed embodiments may further contain additives, as needed. As the additives, examples include, but are not limited to, inorganic particles (for reducing optical distortion of the polyimide film), a silica filler (for smooth winding) and a surfactant (for increasing film-forming and defoaming properties).

3. Properties of Polyimide Film

The polyimide film of the disclosed embodiments has the above-specified total light transmittance, yellowness index, glass transition temperature and tensile elastic modulus. In addition, the polyimide film of the disclosed embodiments preferably has properties described below.

For the polyimide film of the disclosed embodiments, the total light transmittance measured in accordance with JIS K7361-1 is 85% or more. Due to the high transmittance, the polyimide film obtains excellent transparency and can serve as a substitute material for glass. For the polyimide film of the disclosed embodiments, the total light transmittance measured in accordance with JIS K7361-1 is more preferably 88% or more, still more preferably 89% or more, and particularly preferably 90% or more.

For the polyimide film of the disclosed embodiments, at a thickness of from 5 μm to 100 μm, the total light transmittance measured in accordance with JIS K7361-1 is preferably 85% or more, more preferably 88% or more, still more preferably 89% or more, and particularly preferably 90% or more.

For the polyimide film of the disclosed embodiments, at a thickness of 50 μm±5 μm, the total light transmittance measured in accordance with JIS K7361-1 is preferably 85% or more, more preferably 88% or more, still more preferably 89% or more, and particularly preferably 90% or more.

The total light transmittance measured in accordance with JIS K7361-1 can be measured by a haze meter (such as "HM150" manufactured by Murakami Color Research Laboratory Co., Ltd.), for example. A total light transmittance measured for a thickness can be used as follows to obtain a total light transmittance for a different thickness: a corresponding value is obtained by the Beer-Lambert law and used as the total light transmittance for the different thickness.

For the polyimide film of the disclosed embodiments, the yellowness index (YI value) calculated in accordance with JIS K7373-2006 is 30 or less. Due to the low yellowness index, yellowing is inhibited, and light transmittability is increased. Therefore, the polyimide film can serve as a substitute material for glass. The yellowness index (YI value) calculated in accordance with JIS K7373-2006 is preferably 20 or less, more preferably 15 or less, and still more preferably 10 or less.

For the polyimide film of the disclosed embodiments, at a thickness of from 5 μm to 100 μm, the yellowness index (YI value) calculated in accordance with JIS K7373-2006 is 30 or less, more preferably 20 or less, still more preferably 15 or less, and particularly preferably 10 or less.

For the polyimide film of the disclosed embodiments, at a thickness of 50 μm±5 μm, the yellowness index (YI value) calculated in accordance with JIS K7373-2006 is preferably 10 or less, more preferably 7 or less, and still more preferably 5 or less.

The yellowness index (YI value) can be calculated from a transmittance measured by the spectrophotometric colorimetry defined in JIS Z8722, with the use of an UV-Vis-NIR spectrophotometer (such as "V-7100" manufactured by JASCO Corporation) in accordance with JIS K7373-2006.

A yellowness index measured for a thickness can be used as follows to obtain a yellowness index for a different thickness: for transmittances at wavelengths measured at intervals of 5 nm from 380 nm and 780 nm for a sample having a specific film thickness, corresponding values of the transmittances at the wavelengths for a different thickness are obtained by the Beer-Lambert law in the same manner as the above-described total light transmittance, and the yellowness index for the different thickness is calculated from the corresponding values.

The polyimide film of the disclosed embodiments has a glass transition temperature in a temperature range of from 150° C. to 400° C. The temperature range including the glass transition temperature is preferably 200° C. or more, from the viewpoint of obtaining excellent heat resistance, and is preferably 380° C. or less, from the viewpoint of reduction in baking temperature.

The glass transition temperature is obtained from the peak temperature in a temperature –tan δ curve (tan δ=loss elastic modulus (E")/storage elastic modulus (E')) obtained by dynamic viscoelasticity measurement. When there are plural peaks in the tan δ curve, the glass transition temperature of the polyimide film is the temperature of a peak that the local maximum of the peak is the largest. The dynamic viscoelasticity measurement can be carried out by, for example, dynamic viscoelasticity measuring apparatus "RSA III" (manufactured by TA Instruments Japan) in the conditions of a measurement range of from –150° C. to 400° C., a frequency of 1 Hz and a temperature increase rate of 5° C./min. Also, it can be measured in the conditions of a sample width of 5 mm and a chuck distance of 20 mm.

In the disclosed embodiments, the peak in the tan δ curve means a peak which has an inflection point (local maximum) and in which the peak width between the valleys of the peak is 3° C. or more. Fine fluctuation derived from measurement, such as noise, is not deemed as the peak.

Also, it is preferable that the polyimide film of the disclosed embodiment has no peak in a temperature range of from –150° C. to 0° C. in the tan δ curve. If a polyimide film contains a diamine residue containing a long siloxane bond in a main chain thereof, the polyimide film has a peak in such a low temperature range in the tan δ curve. However, since the polyimide film of the disclosed embodiments contains a short bond that is composed of one or two silicon atoms, it generally has no peak in such a low temperature range in the tan δ curve. Therefore, compared to the polyimide film which contains the diamine residue containing the long siloxane bond in the main chain thereof and which has a peak in a temperature range of from –150° C. to 0° C. in a tan δ curve, the polyimide film of the disclosed embodiments can suppress a decrease in tensile elastic modulus at room temperature and can keep enough surface hardness as a protection film.

For the polyimide film of the disclosed embodiments, the tensile elastic modulus at 25° C. obtained by measuring a 15 mm×40 mm test piece at a tensile rate of 10 mm/min and a chuck distance of 20 mm in accordance with JIS K7127, is 1.8 GPa or more. As just described, since the tensile elastic modulus at 25° C. (room temperature) is high, the polyimide film of the disclosed embodiments can keep enough surface hardness as a protection film even at room temperature, and it can be used as a surface material. The tensile elastic modulus is preferably 2.0 GPa or more, and more preferably 2.4 GPa or more. On the other hand, from the viewpoint of increasing flex resistance, the tensile elastic modulus is preferably 5.2 GPa or less. From the viewpoint of increasing flex resistance, the tensile elastic modulus may be 4.0 GPa or less, or it may be 3.5 GPa or less.

The tensile elastic modulus can be measured as follows: using a tensile tester such as "AUTOGRAPH AG-X 1N" (manufactured by Shimadzu Corporation, load cell: SBL-1KN), at 25° C., a polyimide film test piece cut to a size of 15 mm (width)×40 mm (length), is measured at a tensile rate of 10 mm/min and a chuck distance of 20 mm. In the case of obtaining the tensile elastic modulus, the thickness of the polyimide film is preferably 50 μm±5 μm.

For the polyimide film of the disclosed embodiments, from the viewpoint of reducing optical distortion, the birefringence index in the thickness direction at a wavelength of 590 nm, is preferably 0.020 or less. In the case of having such a birefringence index, the polyimide film of the disclosed embodiments can suppress a reduction in displaying quality of displays, when it is used as a surface material for display. The birefringence index in the thickness direction at a wavelength of 590 nm, is preferably smaller. It is preferably 0.015 or less, more preferably 0.010 or less, and still more preferably less than 0.008.

For the polyimide film of the disclosed embodiments, the birefringence index in the thickness direction at a wavelength of 590 nm, can be obtained as follows.

First, using a retardation measuring device such as "KOBRA-WR" (manufactured by Oji Scientific Instruments), the thickness-direction retardation value (Rth) of the polyimide film is measured at 25° C. by a light with a wavelength of 590 nm. The thickness-direction retardation value (Rth) is obtained as follows: the retardation value of incidence at an angle of 0 degrees and the retardation value of incidence at an oblique angle of 40 degrees are measured, and the thickness-direction retardation value Rth is calculated from the retardation values. The retardation value of incidence at an oblique angle of 40 degrees is measured by making a light with a wavelength of 590 nm incident to a retardation film from a direction inclined at an angle of 40 degrees from the normal line of the retardation film.

For the polyimide film of the disclosed embodiments, the birefringence index in the thickness direction can be obtained by plugging the obtained Rth in the following formula: Rth/d. In this formula, d represents the film thickness (nm) of the polyimide film.

The thickness-direction retardation value can be represented as follows:

$$Rth(nm)=\{(nx+ny)/2-nz\} \times d$$

where nx is the refractive index in the slow axis direction in the in-plane direction of the film (the direction in which the refractive index in the in-plane direction of the film is the maximized); ny is the refractive index in the fast axis direction in the in-plane direction of the film (the direction in which the refractive index in the in-plane direction of the film is minimized); and nz is the refractive index in the thickness direction of the film.

For the polyimide film of the disclosed embodiments, the pencil hardness is preferably 2B or higher, more preferably B or higher, and still more preferably HB or higher, from the viewpoint of rigidity.

The pencil hardness of the polyimide film can be evaluated as follows. First, the humidity of an evaluation sample is controlled for two hours in the conditions of a temperature of 25° C. and a relative humidity of 60%. Then, using pencils defined in JIS-S-6006, the pencil hardness test defined in JIS K5600-5-4 (1999) is carried out on the film surface (at a load of 0.98 N), thereby evaluating the highest pencil hardness that leaves no scratch on the film surface. For example, a pencil scratch hardness tester manufactured by Toyo Seiki Seisaku-sho, Ltd., can be used.

For the polyimide film of the disclosed embodiments, the haze value is preferably 10 or less, more preferably 8 or less, and still more preferably 5 or less, from the viewpoint of light transmittability. It is preferable that the haze value can be achieved when the thickness of the polyimide film is 5 μm or more and 100 μm or less.

The haze value can be measured by the method according to JIS K-7105. For example, it can be measured by haze meter "HM150" manufactured by Murakami Color Research Laboratory Co., Ltd.

For the polyimide film of the disclosed embodiments, from the viewpoint of excellent flex resistance, when a static bending test is carried out in accordance with the following static bending test method, an interior angle measured by the test is preferably 120° or more, and more preferably 125° or more:

[Static Bending Test Method]

A polyimide film test piece cut to a size of 15 mm×40 mm, is bent at a position half the long side so that both long side ends of the polyimide film test piece sandwich upper and lower surfaces of a metal piece having a thickness of 6 mm (100 mm×30 mm×6 mm); they are fixed by tape so that an overlapping margin of each end of the polyimide film test piece with the upper or lower surface of the metal piece, is mm; while being in this state, the metal piece and the fixed polyimide film test piece are sandwiched between glass plates (100 mm×100 mm×0.7 mm) to fix the polyimide film test piece in a state of being bent with an inner diameter of 6 mm; at this time, dummy test pieces are each interposed into a part where the polyimide film test piece is not present between the metal piece and either one of the glass plates, and the glass plates are fixed parallel to one another by tape; the polyimide film test piece bent and fixed in this state, is left to stand for 24 hours in a relative humidity (RH) environment of 60° C.±2° C. and 93%±2%; then, the glass plates and the fixing tape are removed to release force applied to the polyimide film test piece; then, one end of the test piece is fixed, and the interior angle of the polyimide film test piece 30 minutes after the release of the applied force, is measured.

Since the polyimide film of the disclosed embodiments is excellent in flex resistance, when a dynamic bending test is carried out by the following dynamic bending test method, the interior angle of a test piece of the polyimide film is preferably 155° or more, and more preferably 160° or more.

[Dynamic Bending Test Method]

A polyimide film test piece cut to a size of 20 mm×100 mm, is fixed on an endurance testing system in a constant temperature and humidity chamber ("TENSION-FREE U-SHAPE FOLDING TEST JIG DMX-FS" for planar objects, manufactured by Yuasa System Co., Ltd.) by tape. The test piece is set to be in the same bending state as the static bending test, that is, the test piece is set so that the distance between both of the long side ends of the bent test piece is 6 mm (fixed in the state of being bent with an inner diameter of 6 mm). Then, the test piece is repeatedly bent 200,000 times, at a rate of 90 times/minute, in the environment at a temperature of 60° C.±2° C. and a relative humidity (RH) of 93%±2%.

Then, the test piece is removed, and one end of the removed test piece is fixed. The interior angle of the test piece 30 minutes after the repeated bending of 200,000 times is measured.

Since the polyimide film of the disclosed embodiments is excellent in surface hardness, the Young's modulus of the polyimide film, which is measured by the following method, is preferably 2.3 GPa or more, and more preferably 2.4 GPa or more.

The Young's modulus is measured at a temperature of 25° C., by the nanoindentation method in accordance with ISO14577. More specifically, "PICODENTOR HM500" (manufactured by Fischer Instruments K.K.) is used as a measurement device, and a Vickers indenter is used as a measurement indenter. Any 8 points on the polyimide film surface is measured, and the average of the measured values is obtained and determined as the Young's modulus. The measurement conditions are a maximum indentation depth of 1000 nm, a weighted time of 20 seconds, and a creep time of 5 seconds.

The atomic percent (atom %) of the silicon atoms (Si) on the film surface, which is measured by X-ray photoelectron spectroscopy of the polyimide film, is preferably 0.1 or more and 10 or less, and more preferably 0.2 or more and 5 or less.

The above ratios measured by X-ray photoelectron spectroscopy (XPS) can be obtained from the values (atom %) of the atoms measured with the use of an X-ray photoelectron spectrometer (such as "THETA PROBE" manufactured by Thermo Scientific).

In a preferred embodiment, the ratio (F/C) between the number of fluorine atoms (F) and the number of carbon atoms (C) on the film surface, which is measured by X-ray photoelectron spectroscopy of the polyimide film, is preferably 0.01 or more and 1 or less, and more preferably 0.05 or more and 0.8 or less.

The ratio (F/N) between the number of fluorine atoms (F) and the number of nitrogen atoms (N) on the film surface, which is measured by X-ray photoelectron spectroscopy of the polyimide film, is preferably 0.1 or more and 20 or less, and more preferably 0.5 or more and 15 or less.

Also, the ratio (F/Si) between the number of fluorine atoms (F) and the number of silicon atoms (Si) on the film surface, which is measured by X-ray photoelectron spectroscopy of the polyimide film, is preferably 1 or more and 50 or less, and more preferably 3 or more and 30 or less.

Also for the polyimide film of the disclosed embodiments, from the viewpoint of adhesion between the polyimide film and the hard coat layer, and the viewpoint of the surface hardness of the laminate in which the polyimide film and the hard coat layer are adjacently disposed, it is preferable that peeling off of a coating film does not occur in an adhesion test that is carried out in accordance with the following adhesion test method.

[Adhesion Test Method]

A resin composition for adhesion evaluation is prepared by adding 1-hydroxy-cyclohexyl-phenyl-ketone to a 40 mass % methyl isobutyl ketone solution of pentaerythritol triacrylate so that 10 parts by mass of 1-hydroxy-cyclohexyl-phenyl-ketone is added with respect to 100 parts by mass of pentaerythritol triacrylate. The resin composition for adhesion evaluation is applied on a polyimide film test piece cut to a size of 10 cm×10 cm, and the applied resin composition is cured by exposure to ultraviolet light at an exposure amount of 200 mJ/cm² under a nitrogen flow, thereby forming a cured film with a film thickness of 10 µm. The cross-cut test in accordance with JIS K 5600-5-6 is carried out on the cured film, and peeling operation by tape is repeatedly carried out thereon, 5 times. Then, the coating film is observed to see if there is a presence or absence of peeling.

4. Structure of Polyimide Film

The thickness of the polyimide film of the disclosed embodiments may be appropriately selected depending on the intended application. It is preferably 1 µm or more, more preferably 5 µm or more, and still more preferably 10 µm or more. On the other hand, it preferably 200 µm or less, more preferably 150 µm or less, and still more preferably 100 µm or less.

When the thickness is small, the polyimide film has low strength and is likely to rupture. When the thickness is large, a large difference is shown between the inner and outer diameters of the film when bent, and large load is applied to the film. Therefore, the flex resistance of the film may decrease.

The polyimide film of the disclosed embodiments may be subjected to a surface treatment such as a saponification treatment, a glow discharge treatment, a corona discharge treatment, an UV treatment and a flame treatment.

5. Method for Producing Polyimide Film

As the method for producing the polyimide film of the disclosed embodiments, examples include, but are not limited to, the following first polyimide film production method comprising steps of:

preparing a polyimide precursor resin composition comprising a polyimide precursor having a structure represented by the following general formula (1') and an organic solvent (hereinafter, this step will be referred to as "polyimide precursor resin composition preparing step"), forming a polyimide precursor resin coating film by applying the polyimide precursor resin composition to a support (hereinafter, this step will be referred to as "polyimide precursor resin coating film forming step"), and imidizing the polyimide precursor by heating (hereinafter, this step will be referred to as "imidizing step"):

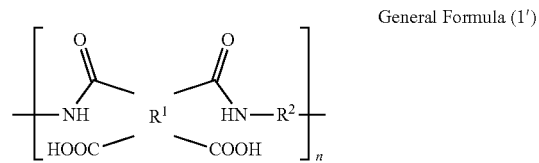

General Formula (1')

where $R^1$, $R^2$ and n are the same as the general formula (1).

The first production method may further comprise stretching at least one of the polyimide precursor resin coating film and an imidized coating film obtained by imidizing the polyimide precursor resin coating film (hereinafter, this step will be referred to as "stretching step").

Hereinafter, the steps will be described in detail.

(1) Polyimide Precursor Resin Composition Preparing Step

The polyimide precursor resin composition prepared in the first production method contains the polyimide precursor represented by the general formula (1') and the organic solvent. As needed, it may further contain an additive, etc. The polyimide precursor represented by the general formula (1') is a polyamide acid obtained by polymerization of a tetracarboxylic acid component, which will be a tetracarboxylic acid residue as $R^1$ in the general formula (1'), and a diamine component, which will be a diamine residue as $R^2$ in the general formula (1').

As $R^1$, $R^2$ and n in the general formula (1'), the same examples as those described above under "1. Polyimide" and provided as $R^1$, $R^2$ and n in the general formula (1), may be used.

At least one of the number average molecular weight and weight average molecular weight of the polyimide precursor represented by the general formula (1') is preferably 10000 or more, and more preferably 20000 or more, from the viewpoint of the strength of the polyimide precursor formed into a film. On the other hand, the average molecular weight is preferably 10000000 or less, and more preferably 500000 or less, from the point of view that the polyimide precursor may obtain high viscosity and low workability (such as filtration) when the average molecular weight is too large.

The number average molecular weight of the polyimide precursor can be obtained by NMR (such as "AVANCE III" manufactured by BRUKER). For example, a solution of the polyimide precursor is applied onto a glass plate and dried at 100° C. for 5 minutes; 10 mg of the dried solid content is dissolved in 7.5 ml of a dimethylsulfoxide-d6 solvent; the solution is subjected to NMR measurement; and the number average molecular weight can be calculated from the peak intensity ratio of the hydrogen atoms bound to the aromatic ring.

The weight average molecular weight of the polyimide precursor can be measured by gel permeation chromatography (GPC).

The polyimide precursor is formed into an N-methylpyrrolidone (NMP) solution in a concentration of 0.5 wt %. A 10 mmol % LiBr-NMP solution having a water content of 500 ppm or less, is used as a developing solvent. A GPC device ("HLC-8120" manufactured by Tosoh Corporation) and columns ("GPC LF-804" manufactured by SHODEX) are used. The measurement is carried out in the condition of an injected sample amount of 50 μL, a solvent flow rate of 0.5 mL/min, and a temperature of 40° C. The weight average molecular weight is obtained on the basis of a polystyrene standard sample in the same concentration as the sample.

The polyimide precursor solution is obtained by reacting the above-mentioned tetracarboxylic dianhydride with the above-mentioned diamine in a solvent. The solvent used for synthesis of the polyimide precursor (polyamide acid) is not particularly limited, as long as it is a solvent that can dissolve the above-mentioned tetracarboxylic dianhydride and diamine. For example, an aprotic polar solvent and a water-soluble, alcohol-based solvent can be used. In the disclosed embodiments, it is preferable to use γ-butyrolactone or an organic solvent containing a nitrogen atom, such as N-methyl-2-pyrrolidone, N,N-dimethylformamide, N,N-dimethylacetamide, dimethylsulfoxide, hexamethylphosphoramide and 1,3-dimethyl-2-imidazolidinone. In the case of using the polyimide precursor solution (the polyamide acid solution) as it is for preparing the polyimide precursor resin composition, when the polyimide precursor resin composition contains inorganic particles described below, from the viewpoint of inhibiting dissolution of the inorganic particles, it is preferable to use the organic solvent containing a nitrogen atom, and it is more preferable to use N,N-dimethylacetamide, N-methyl-2-pyrrolidone or a combination thereof. The organic solvent is a solvent containing a carbon atom.

The polyimide precursor solution is prepared by combining at least two kinds of diamines. The polyamide acid may be synthesized by adding acid dianhydride to a mixed solution of at least two kinds of diamines, or at least two kinds of diamines at an appropriate molar ratio may be added to the reaction solution in steps, and the sequence in which the raw materials are incorporated in a polymer chain may be controlled to some extent.

For example, the polyamide acid may be polymerized as follows: to a reaction solution in which a diamine containing one or two silicon atoms in a main chain thereof is dissolved, acid dianhydride at a molar ratio of 0.5 equivalents of the diamine containing one or two silicon atoms in the main chain thereof, is added and reacted, thereby synthesizing an amide acid in which the diamine containing one or two silicon atoms in the main chain thereof, is reacted with both terminals of the acid dianhydride; moreover, a part or all of the rest of the diamine is added thereto, followed by addition of acid dianhydride, thereby polymerizing the polyamide acid. In the case of the polymerization by this method, the diamine containing one or more silicon atoms in the main chain thereof, is introduced in the polyamide acid, in the state of being connected through one acid dianhydride.

Polymerization of the polyamide acid by this method is preferred, since the positional relationship of the amide acid containing one or two silicon atoms in the main chain thereof, is specified to some extent, and a film having excellent flexibility while keeping surface hardness, is easily obtained.

When the molar number of the diamine in the polyimide precursor solution (the polyamide solution) is determined as X and that of the tetracarboxylic dianhydride is determined as Y, Y/X is preferably 0.9 or more and 1.1 or less, more preferably 0.95 or more and 1.05 or less, still more preferably 0.97 or more and 1.03 or less, and most preferably 0.99 or more and 1.01 or less. When Y/X is within such a range, the molecular weight (polymerization degree) of the thus-obtained polyamide acid can be appropriately controlled.

The method of the polymerization reaction is not particularly limited and can be appropriately selected from conventional methods.

Also, the polyimide precursor solution obtained by the synthesis reaction may be used as it is and then mixed with other component, as needed. Or, the solvent of the polyimide precursor solution may be dried, and the polyimide precursor may be dissolved in other solvent and used.

The viscosity of the polyimide precursor solution at 25° C., is preferably 500 cps or more and 200000 cps or less, from the viewpoint of forming a uniform coating film and a uniform polyimide film.

The viscosity of the polyimide precursor solution can be measured by a viscometer (such as "TVE-22HT" manufactured by Toki Sangyo Co., Ltd.) at 25° C.

The polyimide precursor resin composition may further contain additives, as needed. As the additives, examples include, but are not limited to, inorganic particles (for reducing optical distortion of the polyimide film), a silica filler (for smooth winding) and a surfactant (for increasing film-forming and defoaming properties). As the additive, those mentioned above in relation to the polyimide film cam be used.

The organic solvent used in the polyimide precursor resin composition is not particularly limited, as long as it can dissolve the polyimide precursor. For example, γ-butyrolactone and an organic solvent containing a nitrogen atom can be used, such as N-methyl-2-pyrrolidone, N,N-dimethylformamide, N,N-dimethylacetamide, dimethylsulfoxide, hexamethylphosphoramide and 1,3-dimethyl-2-imidazolidinone. Due to the above-described reason, it is preferable to use the organic solvent containing a nitrogen atom.

The content of the polyimide precursor in the polyimide precursor resin composition is preferably 50 mass % or more of the solid content of the resin composition, and more preferably 60 mass % or more, from the viewpoint of forming a uniform coating film and a polyimide film with enough strength to handle the film. The upper limit may be appropriately controlled depending on the contained components.

When the polyimide precursor resin composition contains the inorganic particles, the content of the inorganic particles is appropriately determined, depending on the desired optical properties. From the viewpoint of controlling the optical properties, the inorganic particles are preferably 0.01 mass % or more of the solid content of the resin composition, and more preferably 0.05 mass % or more. On the other hand, it is preferably 50 mass % or less, and more preferably 40 mass % or less.

From the viewpoint of forming a uniform coating film and a uniform polyimide film, the organic solvent in the polyimide precursor resin composition is preferably 40 mass % or more of the resin composition, and more preferably 50 mass % or more. On the other hand, it is preferably 99 mass % or less.

The water content of the polyimide precursor resin composition is preferably 1000 ppm or less, from the point of view that the polyimide precursor resin composition can obtain excellent storage stability, and the productivity can be improved. When the water content of the polyimide precursor resin composition is large, the polyimide precursor is likely to decompose. In addition, when the polyimide precursor resin composition contains the inorganic particles, the inorganic particles may be dissolved and may not function as a refractive index controlling component.

The water content of the polyimide precursor resin composition can be obtained by, for example, a Karl Fischer water content meter (such as moisture meter "CA-200" manufactured by Mitsubishi Chemical Corporation).

The method for preparing the polyimide precursor resin composition is not particularly limited. When the polyimide precursor resin composition contains the inorganic particles, as the method, examples include, but are not limited to, 1) dispersing the inorganic particles in the polyimide precursor solution and uniformizing the mixture, 2) mixing the polyimide precursor solution with the organic solvent in which the inorganic particles are dispersed, and uniformizing the mixture, and 3) dissolving the polyimide precursor in the organic solvent in which the inorganic particles are dispersed, and uniformizing the mixture.

As described above, to obtain the polyimide precursor resin composition having a water content of 1000 ppm or less, it is preferable to dry the inorganic particles in advance before use, or it is preferable to use a dehydrated organic solvent or an organic solvent with a controlled water content and handle the organic solvent in an environment at a humidity of 5% or less.

As the method for dispersing the inorganic particles in the organic solvent, conventionally known methods such as stirring and ultrasonic irradiation can be used. From the viewpoint of preventing water contamination, a dispersion method without the use of a medium such as inorganic beads is preferred, and a dispersion method by ultrasonic irradiation, vibration or the like is preferably used.

The viscosity of the polyimide precursor resin composition at a solid content concentration of 15 wt % and 25° C., is preferably 500 cps or more and 100000 cps or less from the viewpoint of forming a uniform coating film and a uniform polyimide film.

The viscosity of the polyimide precursor resin composition can be measured by a viscometer (such as "TVE-22HT" manufactured by Toki Sangyo Co., Ltd.) at 25° C., using a sample in an amount of 0.8 ml.

(2) Polyimide Precursor Resin Coating Film Forming Step

In the step of forming a polyimide precursor resin coating film by applying the polyimide precursor resin composition to a support, the support is not particularly limited, as long as it is a material with a smooth surface, heat resistance and solvent resistance. As the support, examples include, but are not limited to, an inorganic material such as a glass plate, and a metal plate with a mirror polished surface. The form of the support is selected depending on the applying method. For example, it may be a plate form, a drum form, a belt form, or a sheet form that can be wound into a roll.

The applying means is not particularly limited, as long as it is a means that can apply the polyimide precursor resin composition to a desired film thickness. For example, conventionally known devices such as a die coater, a comma coater, a roll coater, a gravure coater, a curtain coater, a spray coater and a lip coater, can be used.

The polyimide precursor resin composition can be applied by a sheet-fed coater, or it can be applied by a roll-to-roll coater.

After the polyimide precursor resin composition is applied to the support, the solvent in the coating film is dried at a temperature of 150° C. or less, preferably at a temperature of 30° C. or more and 120° C. or less, until the coating film becomes a tack-free coating film. By controlling the solvent drying temperature to 150° C. or less, imidization of the polyamide acid can be inhibited.

The drying time may be appropriately controlled, depending on the film thickness of the polyimide precursor resin coating film, the type of the solvent, the drying temperature, etc. It is generally from 1 minute to 60 minutes, and preferably from 2 minutes to 30 minutes. It is not preferable to exceed the upper limit, from the viewpoint of production efficiency of the polyimide film. On the other hand, when the drying time is below the lower limit, rapid drying of the solvent may have adverse effects on the appearance and so on of the polyimide film thus obtained.

The method for drying the solvent is not particularly limited, as long as it is a method that can dry the solvent at the above temperature. For example, an oven, a drying furnace, a hot plate and infrared heating can be used.

When advanced control of the optical properties is necessary, the solvent is preferably dried in an inert gas atmosphere. The inert gas atmosphere is preferably a nitrogen atmosphere, and the oxygen concentration is preferably 100 ppm or less, and more preferably 50 ppm or less. When heated in air, the film is oxidized and may be colored or result in performance degradation.

(3) Imidizing Step

In the first production method, the polyimide precursor is imidized by heating.

When the production method includes the stretching step, the imidizing step may be carried out on the polyimide precursor in the polyimide precursor resin coating film before the stretching step; it may be carried out on the polyimide precursor in the polyimide precursor resin coating film after the stretching step; or it may be carried out on both the polyimide precursor in the polyimide precursor resin coating film before the stretching step and the polyimide precursor present in the film after the stretching step.

The imidizing temperature may be appropriately selected depending on the structure of the polyimide precursor.

In general, the heating start temperature is preferably 30° C. or more, and more preferably 100° C. or more. On the other hand, the heating end temperature is preferably 250° C. or more.

It is preferable that the temperature increase rate is appropriately selected depending on the film thickness of the polyimide film to be obtained. When the film thickness of the polyimide film is thick, it is preferable to lower the temperature increase rate.

From the viewpoint of production efficiency of the polyimide film, the temperature increase rate is preferably 5° C./min or more, and more preferably 10° C./min or more. On the other hand, the upper limit of the temperature increase rate is generally 50° C./min, preferably 40° C./min or less, and still more preferably 30° C./min or less. It is preferable that the temperature increase rate is set as above, from the viewpoints of inhibiting defects in the appearance and strength of the film, controlling whitening associated with the imidization reaction, and increasing light transmittability.

The heating may be carried out continuously or in steps. It is preferably carried out continuously, from the viewpoint of inhibiting defects in the appearance and strength of the film, and controlling whitening associated with the imidization reaction. Also, the temperature increase rate may be constant in the above temperature range, or it may be changed in the middle.

For imidization, the heating is preferably carried out in an inert gas atmosphere. The inert gas atmosphere is preferably a nitrogen atmosphere, and the oxygen concentration is preferably 500 ppm or less, more preferably 200 ppm or less, and still more preferably 100 ppm or less. When heated in air, the film is oxidized and may be colored or result in performance degradation.

However, when 50% or more of the hydrogen atoms bound to the carbon atoms contained in the polyimide precursor, are hydrogen atoms directly bound to the aromatic ring, the effect of oxygen on the optical properties is small, and a polyimide with high light transmittability can be obtained without the use of the inert gas atmosphere.

The heating method for imidization is not particularly limited, as long as it is a method that allows heating at the above temperature. For example, an oven, a heating furnace, infrared heating and electromagnetic induction heating can be used.

It is preferable to control the imidization rate of the polyimide precursor to 50% or more before the stretching step. By controlling the imidization rate to 50% or more before the stretching step, poor film appearance and film whitening are inhibited even when the film is stretched after the controlling step and then heated for a certain amount of time at a high temperature for imidization. Especially from the viewpoint of increasing the surface hardness of the polyimide film, it is preferable to control the imidization rate to 80% or more, more preferably 90% or more, and still more preferably 100%, in the imidizing step and before the stretching step. By stretching the film after the imidization, the rigid polymer chain is easily oriented; therefore, it is presumed that the surface hardness of the polyimide film is increased.

The imidization rate can be measured by IR spectral analysis, for example.

To obtain the final polyimide film, it is preferable to proceed with the imidization reaction until the imidization rate reaches 90% or more, 95% or more, or 100%.

To proceed with the imidization reaction until the imidization rate reaches 90% or more, or 100%, it is preferable that the coating film is kept at the heating end temperature for a certain amount of time. The temperature keeping time is generally from 1 minute to 180 minutes, and preferably from 5 minutes to 150 minutes.

(4) Stretching Step

The first production method may include a step of stretching at least one of the polyimide precursor resin coating film and an imidized coating film obtained by imidizing the polyimide precursor resin coating film. When the first production method includes the stretching step, from the viewpoint of increasing the surface hardness of the polyimide film, the first production method preferably includes the step of stretching the imidized coating film.

In the first production method, when the initial size of the film before stretching is determined as 100%, the step of stretching the film to 101% or more and 10000% or less, is preferably carried out while the film is heated at a temperature of 80° C. or more.

At the time of stretching, it is preferable that the heating temperature is in a range of plus or minus 50° C. of the glass transition temperature of the polyimide or polyimide precursor, and it is more preferable that the heating temperature is in a range of plus or minus 40° C. of the glass transition temperature. When the stretching temperature is too low, the film may not be deformed, and orientation may not be sufficiently induced. On the other hand, when the stretching temperature is too high, orientation obtained by the stretching may be relaxed due to the temperature, and sufficient orientation may not be obtained.

The stretching step may be carried out simultaneously with the imidizing step. From the viewpoint of increasing the surface hardness of the polyimide film, the imidized coating film is preferably stretched after the imidization rate reaches 80% or more, more preferably 90% or more, still more preferably 95% or more, and most preferably substantially 100%.

The polyimide film is preferably stretched at a magnification of 101% or more and 10000% or less, and more preferably 101% or more and 500% or less. By stretching the polyimide film in the range, the surface hardness of the polyimide film thus obtained can be increased further.

At the time of stretching, the method for fixing the film is not particularly limited and is selected depending on the type and so on of a stretching device. Also, the stretching method is not particularly limited. For example, the film can be stretched with the use of a stretching device equipped with a carrier device (e.g., tenter), while passing the film through a heating furnace. The polyimide film may be stretched only in one direction (longitudinal or transverse stretching), or it may be stretched in two directions by simultaneous biaxial stretching, sequential biaxial stretching, diagonal stretching, etc.

As the method for producing the polyimide film of the disclosed embodiments, examples include, but are not limited to, the following second production method comprising steps of:

preparing a polyimide resin composition comprising the polyimide containing the structure represented by the general formula (1) and an organic solvent (hereinafter, this step will be referred to as "polyimide resin composition preparing step") and forming a polyimide resin coating film by applying the polyimide resin composition to a support and drying the solvent (hereinafter, this step will be referred to as "polyimide resin coating film forming step").

When the polyimide containing the structure represented by the general formula (1) is dissolved well in the organic solvent, a polyimide resin composition in which the polyimide is dissolved in the organic solvent and an additive is contained as needed, can be suitably used in place of the polyimide precursor resin composition.

This production method can be suitably used when the polyimide containing the structure represented by the general formula (1) has such solvent solubility that 5 mass % or more of the polyimide is dissolved in the organic solvent at 25° C.

In the polyimide resin composition preparing step, as the polyimide containing the structure represented by the general formula (1), a polyimide with the above-mentioned solvent solubility can be selected from the same polyimides as those described above under "I. Polyimide film" and used. As the imidizing method, it is preferable to use chemical imidization in which a dehydration cyclization reaction of the polyimide precursor is carried out with the use of a chemical imidization agent, in place of heating and dehydrating. In the case of carrying out the chemical imidization, a known compound such as amine (e.g., pyridine, β-picolinic acid), carbodiimide (e.g., dicyclohexylcarbodiimide) and acid anhydride (e.g., acetic anhydride) may be used as a dehydration catalyst. The acid anhydride is not limited to acetic anhydride, and examples include, but are not limited to, propionic anhydride, n-butyric anhydride, benzoic anhydride and trifluoroacetic anhydride. Also, tertiary amine such as pyridine and β-picolinic acid may be used in combination with the acid anhydride. However, these amines decrease optical properties, especially yellowness index (YI value), when they remain in the film. Accordingly, instead of casting the reaction solution as it is, in which the precursor is reacted into the polyimide, and forming the reaction solution into a film, it is preferable to purify the reaction solution by reprecipitation or the like to remove the components other than the polyimide to 100 ppm or less of the total weight of the polyimide, thus forming the reaction solution into a film.

As the organic solvent used in the polyimide resin composition preparing step, the same organic solvent as that used in the first production method described above under "(1) Polyimide precursor resin composition preparing step" can be used.

As needed, the polyimide resin composition may contain additives. As the additives, the same additives as those used in the first production method described above under "(1) Polyimide precursor resin composition preparing step" can be used.

As the method for controlling the water content of the polyimide resin composition to 1000 ppm or less, and the method for dispersing the inorganic particles in the organic solvent, the same methods as those used in the first production method described above under "(1) Polyimide precursor resin composition preparing step" can be used in the second method.

In the polyimide resin coating film forming step of the second production method, as the support and applying method, the same support and applying method as those used in the first production method described above under "(2) Polyimide precursor resin coating film forming step" can be used.

In the polyimide resin coating film forming step of the second production method, the drying temperature is preferably 80° C. or more and 150° C. or less, under normal pressure. Under reduced pressure, the drying temperature is preferably 10° C. or more and 100° C. or less.

Following the polyimide resin coating film forming step, the second production method may include a step of stretching the polyimide resin coating film. The stretching step may be the same as the stretching step of the first production method.

6. Intended Application of Polyimide Film

The intended application of the polyimide film of the disclosed embodiments is not particularly limited. The polyimide film can be used as a substrate in place of conventional glass products such as a thin glass plate, or it can be used as a member of a surface material, etc. Since the polyimide film of the disclosed embodiments has increased flex resistance, enough surface hardness as a protection film, and reduced optical distortion, it can be suitably used as a surface material for display, which is configured to adapt to a curved surface.

In particular, the polyimide film of the disclosed embodiments can be used in thin and foldable flexible-type organic EL displays and flexible panels used in mobile terminals (such as a smart phone and a wristwatch-type terminal), display devices installed inside cars, and wristwatches. Also, the polyimide film of the disclosed embodiments can be applied to members for image display devices (such as a liquid crystal display device and an organic EL display device), members for touch panels, a flexible printed circuit board, members for solar panels (such as a surface protection film and a substrate material), members for optical waveguides, and members relating to semiconductors.

II. Laminate

The laminate of the disclosed embodiments is a laminate wherein the polyimide film according to the disclosed embodiments and a hard coat layer containing a polymer of at least one of a radically polymerizable compound and a cationically polymerizable compound, are adjacently disposed.

Since the laminate of the disclosed embodiments uses the polyimide film of the disclosed embodiments, it has increased flex resistance. In addition, since the laminate of the disclosed embodiments includes the hard coat layer and it is excellent in adhesion between the polyimide film and the hard coat layer, the laminate of the disclosed embodiments has increased surface hardness. The reason for the excellent adhesion between the polyimide film and the hard coat layer of the laminate of the disclosed embodiments, is presumed as follows: since the polyimide containing the structure represented by the general formula (1), which is contained in the polyimide film, contains the specific amount of the diamine residues each containing one or two silicon atoms in the main chain thereof, the polyimide is excellent in mixing with the specific hard coat layer.

Also, since the laminate of the disclosed embodiments uses the polyimide film of the disclosed embodiments, it has reduced optical distortion. Therefore, when the laminate of the disclosed embodiments used as a surface material for display, a reduction in displaying quality of displays can be suppressed.

1. Polyimide Film

No description will be given here, since the above-described polyimide film of the disclosed embodiments can be used as the polyimide film of the laminate of the disclosed embodiments.

2. Hard Coat Layer

The hard coat layer used in the laminate of the disclosed embodiments contains a polymer of at least one of a radically polymerizable compound and a cationically polymerizable compound.

(1) Radically Polymerizable Compound

The radically polymerizable compound is a compound containing a radically polymerizable group. The radically polymerizable group contained in the radically polymerizable compound is not particularly limited, as long as it is a functional group that can produce a radical polymerization reaction. As the radically polymerizable group, examples include, but are not limited to, a group containing a carbon-carbon unsaturated double bond, such as a vinyl group and a (meth)acryloyl group. When the radically polymerizable compound contains two or more radically polymerizable groups, the radically polymerizable groups may be the same as or different from each other.

The number of the radically polymerizable groups contained per molecule of the radically polymerizable compound, is preferably two or more, and more preferably three or more, from the viewpoint of increasing the hardness of the hard coat layer.

As the radically polymerizable compound, from the viewpoint of high reactivity, a compound containing a (meth)acryloyl group is preferred. Also, a compound referred to as polyfunctional acrylate monomer, which is a compound containing 2 to 6 (meth)acryloyl groups per molecule, or an oligomer referred to as urethane (meth)acrylate, polyester (meth)acrylate or epoxy (meth)acrylate, which is an oligomer containing several (meth)acryloyl groups per molecule and having a molecular weight of several hundreds to several thousands, can be preferably used.

In this Description, "(meth)acryloyl" means any of acryloyl and methacryloyl, and "(meth)acrylate" means any of acrylate and methacrylate.

As the radically polymerizable compound, examples include, but are not limited to, vinyl compounds such as divinylbenzene; polyol polyacrylates such as ethylene glycol di(meth)acrylate, bisphenol A epoxy di(meth) acrylate, 9,9-bis[4-(2-(meth)acryloyloxyethoxy)phenyl]fluorene, alkylene oxide-modified bisphenol A di(meth)acrylate (e.g., ethoxylated (ethylene oxide-modified) bisphenol A dii(meth) acrylate), trimethylolpropane tri(meth)acrylate, trimethylol ethane tri(meth)acrylate, pentaerythritol tri(meth)acrylate, pentaerythritol tetra(meth)acrylate, dipentaerythritol tri (meth)acrylate, dipentaerythritol tetra(meth)acrylate, dipentaerythritol penta(meth)acrylate, and dipentaerythritol hexa (meth)acrylate; epoxy acrylates such as diacrylate of bisphenol A diglycidyl ether, and diacrylate of hexanediol diglycidyl ether; and urethane acrylate obtained by reaction of a polyisocyanate with an acrylate containing a hydroxyl group, such as hydroxyethyl acrylate.

(2) Cationically Polymerizable Compound

The cationically polymerizable compound is a compound containing a cationically polymerizable group. The cationically polymerizable group contained in the cationically polymerizable compound is not particularly limited, as long as it is a functional group that can produce a cationic polymerization reaction. As the cationically polymerizable group, examples include, but are not limited to, an epoxy group, an oxetanyl group and a vinyl ether group. When the cationically polymerizable compound contains two or more cationically polymerizable groups, the cationically polymerizable groups may be the same as or different from each other.

The number of the cationically polymerizable group contained per molecule of the cationically polymerizable compound, is preferably two or more, and more preferably three or more, from the viewpoint of increasing the hardness of the hard coat layer.

The cationically polymerizable compound is preferably a compound containing, as the cationically polymerizable group, at least one of an epoxy group and an oxetanyl group. Cyclic ether groups such as an epoxy group and an oxetanyl group are preferred since shrinkage in association with a polymerization reaction is small. Also, a compound containing, of cyclic ether groups, an epoxy group has the following advantages: compounds of various structures are available; there is no influence on the durability of the thus-obtained hard coat layer; and compatibility with the radically polymerizable compound can be easily controlled. Of cyclic ether groups, an oxetanyl group has the following advantages: it has higher polymerization degree than epoxy group; it is low in toxicity; and when the thus-obtained hard coat layer is combined with a compound containing an epoxy group, the rate of formation of a network obtained from the cationically polymerizable compound in the coating film, can be accelerated, and an independent network is formed even in a region where the cationically polymerizable group is mixed with the radically polymerizable compound, without leaving an unreacted monomer in the film.

As the cationically polymerizable compound containing an epoxy group, examples include, but are not limited to, polyglycidyl ether of polyhydric alcohol containing an alicyclic ring; an alicyclic epoxy resin obtained by epoxidizing a cyclohexene ring- or cyclopentene ring-containing compound with an appropriate oxidant such as hydrogen peroxide or peroxy acid; aliphatic epoxy resins such as polyglycidyl ether of aliphatic polyhydric alcohol or alkylene oxide adduct thereof, polyglycidyl ester of aliphatic long-chain polyprotic acid, and homopolymers and copolymers of glycidyl (meth)acrylate; glycidyl ether-type epoxy resins such as glycidyl ether produced by reaction of epichlorohydrin with bisphenol (e.g., bisphenol A, bisphenol F and hydrogenated bisphenol A) or a derivative such as an alkylene oxide adduct thereof and a caprolactone adduct thereof, and a glycidyl ether-type epoxy resin that is novolac epoxy resin and derived from bisphenol.

As the alicyclic epoxy resin, examples include, but are not limited to, 3,4-epoxycyclohexylmethyl-3,4-epoxycyclohexane carboxylate ("UVR-6105", "UVR-6107" and "UVR-6110" manufactured by Dow Chemical Company) and bis-3,4-epoxycyclohexylmethyl adipate ("UVR-6128" manufactured by Dow Chemical Company).

As the glycidyl ether-type epoxy resin, examples include, but are not limited to, sorbitol polyglycidyl ether (DENACOL EX-611, DENACOL EX-612, DENACOL EX-614, DENACOL EX-614B, DENACOL EX-622), polyglycerol polyglycidyl ether (DENACOL EX-512, DENACOL EX-521), pentaerythtol polyglycidyl ether (DENACOL EX-411), diglycerol polyglycidyl ether (DENACOL EX-421), glycerol polyglycidyl ether (DENACOL EX-313, DENACOL EX-314), trimethylolpropane polyglycidyl ether (DENACOL EX-321), resorcinol diglycidyl ether (DENACOL EX-201), neopentyl glycol diglycidyl ether (DENACOL EX-211), 1,6-hexanediol diglycidyl ether (DENACOL EX-212), hydrogenerated bisphenol A diglycidyl ether (DENACOL EX-252), ethylene glycol diglycidyl ether (DENACOL EX-810, DENACOL EX-811), polyethylene glycol diglycidyl ether (DENACOL EX-850, DENACOL EX-851, DENACOL EX-821), propylene glycol glycidyl ether (DENACOL EX-911), polypropylene glycol glycidyl ether (DENACOL EX-941, DENACOL EX-920), allyl glycidyl ether (DENACOL EX-111), 2-ethylhexyl glycidyl ether (DENACOL EX-121), phenyl glycidyl ether (DENACOL EX-141), phenol glycidyl ether (DENACOL EX-145), butyl phenyl glycidyl ether (DENACOL EX-146), diglycidyl phthalate (DENACOL EX-721), hydroquinone diglycidyl ether (DENACOL EX-203), diglycidyl terephthalate (DENACOL EX-711), glycidyl phthalimide (DENACOL EX-731), dibromophenyl glycidyl ether (DENACOL EX-147), dibromoneopentyl glycol diglycidyl ether (DENACOL EX-221) (names in parentheses are product names, all manufactured by Nagase ChemteX Corporation).

Commercially-available epoxy resin products include EPIKOTE 825, EPIKOTE 827, EPIKOTE 828, EPIKOTE 828EL, EPIKOTE 828XA, EPIKOTE 834, EPIKOTE 801, EPIKOTE 801P, EPIKOTE 802, EPIKOTE 815, EPIKOTE 815XA, EPIKOTE 816A, EPIKOTE 819, EPIKOTE 834X90, EPIKOTE 1001B80, EPIKOTE 1001X70, EPIKOTE 1001X75, EPIKOTE 1001T75, EPIKOTE 806, EPIKOTE 806P, EPIKOTE 807, EPIKOTE 152, EPIKOTE 154, EPIKOTE 871, EPIKOTE 191P, EPIKOTE YX310, EPIKOTE DX255, EPIKOTE YX8000 and EPIKOTE YX8034 (product names, all manufactured by Japan Epoxy Resins Co., Ltd.), for example.

As the cationically polymerizable compound containing an oxetanyl group, examples include, but are not limited to, 3-ethyl-3-hydroxymethyloxetane (OXT-101), 1,4-bis-3-ethyloxetane-3-ylmethoxymethylbenzene (OXT-121), bis-1-ethyl-3-oxetanyl methyl ether (OXT-221), 3-ethyl-3-2-ethylhexyloxymethyloxetane (OXT-212), 3-ethyl-3-phenoxymethyloxetane (OXT-211) (names in parentheses are product names, all manufactured by Toagosei Co., Ltd.) and ETERNACOLL EHO, ETERNACOLL OXBP, ETERNACOLL OXTP and ETERNACOLL OXMA (names in parentheses are product names, all manufactured by Ube Industries, Ltd.)

It is particularly preferable that the radically polymerizable compound is a compound containing two or more (meth)acryloyl groups per molecule, and the cationically polymerizable compound is a compound containing two or more groups per molecule, which are selected from the group consisting of an epoxy group and an oxetanyl group, from the viewpoint of adhesion between the polyimide film and the hard coat layer, and from the viewpoint of light transmittability and surface hardness.

(3) Polymerization Initiator

The polymer of at least one of the radically polymerizable compound and the cationically polymerizable compound contained in the hard coat layer used in the disclosed embodiments, can be obtained by polymerizing at least one of the radically polymerizable compound and the cationically polymerizable compound by a known method. As needed, a polymerization initiator may be added.

The polymerization initiator can be appropriately selected from a radical polymerization initiator, a cationic polymerization initiator, a radical and cationic polymerization initiator, etc. These polymerization initiators are decomposed by at least one of light irradiation and heating, thereby producing a radical or cation and promotes radical polymerization and cationic polymerization.

The radical polymerization initiator may be a polymerization initiator that can release a substance that can initiate radical polymerization by any one of light irradiation and heating.

As the radical polymerization initiator, examples include a photo-radical polymerization initiator such as imidazole derivatives, bisimidazole derivatives, N-arylglycine derivatives, organic azide compounds, titanocenes, aluminate complexes, organic peroxides, N-alkoxypyridinium salts and thioxanthone derivatives. More specifically, examples include, but are not limited to, 1,3-di(tert-butyldioxycarbonyl)benzophenone, 3,3',4,4'-tetrakis(tert-butyldioxycarbonyl)benzophenone, 3-phenyl-5-isoxazolone, 2-mercaptobenzimidazole, bis(2,4,5-triphenyl)imidazole, 2,2-dimethoxy-1,2-diphenylethan-1-one ("IRGACURE 651" manufactured by Ciba Japan K.K.), 1-hydroxy-cyclohexylphenyl-ketone ("IRGACURE 184" manufactured by Ciba Japan K.K.), 2-benzyl-2-dimethylamino-1-(4-morpholinophenyl)-butan-1-one ("IRGACURE 369" manufactured by Ciba Japan K.K.), bis(η5-2,4-cyclopentadiene-1-yl)-bis(2,6-difluoro-3-(1H-pyrrole-1-yl)-phenyl)titanium) ("IRGACURE 784" manufactured by Ciba Japan K.K.)

In addition to the above, other commercially-available products can be used. As the other commercially-available products, examples include, but are not limited to, IRGACURE 907, IRGACURE 379, IRGACURE 819, IRGACURE 127, IRGACURE 500, IRGACURE 754, IRGACURE 250, IRGACURE 1800, IRGACURE 1870, IRGACURE OXE01, DAROCUR TPO and DAROCUR 1173 (product names, all manufactured by Ciba Japan K.K.), SPEEDCURE MBB, SPEEDCURE PBZ, SPEEDCURE ITX, SPEEDCURE CTX, SPEEDCURE EDB, ESACURE ONE, ESACURE KIP150 and ESACURE KT046 (product names, all manufactured by Nihon Siberhegner K.K.) and KAYACURE DETX-S, KAYACURE CTX, KAYACURE BMS and KAYACURE DMBI (product names, all manufactured by Nippon Kayaku Co., Ltd.)

The cationic polymerization initiator may be a polymerization initiator that can release a substance that that can initiate cationic polymerization by any one of light irradiation and heating. As the cationic polymerization initiator, examples include, but are not limited to, sulfonic ester, imide sulfonate, dialkyl-4-hydroxysulfonium salt, arylsulfonic acid-p-nitrobenzyl ester, silanol-aluminum complex, ($\eta^6$-benzene) ($\eta^5$-cyclopentadienyl)iron(II). More specifically, examples include, but are not limited to, benzoin tosylate, 2,5-dinitrobenzyl tosylate, and N-tosylphthalic imide.

As the polymerization initiator that can be used as both the radical polymerization initiator and the cationic polymerization initiator, examples include, but are not limited to, aromatic iodonium salts, aromatic sulfonium salts, aromatic diazonium salts, aromatic phosphonium salts, triazine compounds, and iron arene complexes. More specifically, examples include, but are not limited to, iodonium salts such as chlorides, bromides, fluoroborate salt, hexafluorophosphate salt, and hexafluoroantimonate salt, of iodoniums such as diphenyliodonium, ditolyliodonium, bis(p-tert-butylphenyl)iodonium and bis(p-chlorophenyl)iodonium); sulfonium salts such as chlorides, bromides, fluoroborate salt, hexafluorophosphate salt, and hexafluoroantimonate salt, of sulfoniums such as triphenylsulfonium, 4-tert-butyltriphenylsulfonium, and tris(4-methylphenyl)sulfonium; and 2,4,6-substituted-1,3,5 triazine compounds such as 2,4,6-tris(trichloromethyl)-1,3,5-triazine, 2-phenyl-4,6-bis(trichloromethyl)-1,3,5-triazine, and 2-methyl-4,6-bis(trichloromethyl)-1,3,5-triazine.

(4) Additives

In addition to the above polymer, as needed, the hard coat layer used in the disclosed embodiments may contain additives such as an antistatic agent, an antiglare agent, an antifoulant, inorganic or organic fine particles for increasing hardness, a leveling agent, and various kinds of sensitizers.

3. Structure of Laminate

The laminate of the disclosed embodiments is not particularly limited, as long as it is a laminate in which the polyimide film and the hard coat layer are adjacently disposed. The laminate of the disclosed embodiments may be a laminate in which the hard coat layer is adjacently disposed on one side of the polyimide film, or a laminate in which the hard coat layers are adjacently disposed on both surfaces of the polyimide film. Also, the laminate of the disclosed embodiments may be a laminate in which, as long as the effects of the disclosed embodiments are not impaired, the polyimide film, the hard coat layer and another layer (such as urethane-containing or acrylic resin-containing gel) are stacked.

The total thickness of the laminate of the disclosed embodiments can be appropriately determined, depending on the intended application. From the viewpoint of strength, it is preferably 10 μm or more, and more preferably 40 μm or more. On the other hand, from the viewpoint of flex resistance, it is preferably 300 μm or less, and more preferably 250 μm or less.

Also for the laminate of the disclosed embodiments, the thickness of the hard coat layer can be appropriately determined, depending on the intended application. It is preferably 2 μm or more and 80 μm or less, and more preferably μm or more and 50 μm or less. From the viewpoint of prevention of curling, the hard coat layer may be formed on both surfaces of the polyimide film.

4. Properties of Laminate

For the laminate of the disclosed embodiments, the pencil hardness of the hard coat layer-side surface is preferably H or harder, more preferably 2H or harder, and still more preferably 3H or harder.

The pencil hardness of the laminate of the disclosed embodiments can be measured in the same manner as the pencil hardness of the polyimide film.

For the laminate of the disclosed embodiments, the total light transmittance measured in accordance with JIS K7361-1 is preferably 85% or more, more preferably 88% or more, and still more preferably 90% or more. Due to the high transmittance, the laminate of the disclosed embodiments obtains excellent transparency and can serve as a substitute material for glass.

The total light transmittance of the laminate of the disclosed embodiment can be measured in the same manner as the total light transmittance measured in accordance with JIS K7361-1 of the polyimide film.

For the laminate of the disclosed embodiments, the yellowness index (YI value) calculated in accordance with JIS K7373-2006 is preferably 30 or less, more preferably 20 or less, still more preferably 15 or less, and particularly preferably 10 or less.

The yellowness index (YI value) of the laminate of the disclosed embodiments can be measured in the same manner as the yellowness index (YI value) calculated in accordance with JIS K7373-2006 of the polyimide film.

For the laminate of the disclosed embodiments, the haze value is preferably 10 or less, more preferably 8 or less, and still more preferably 5 or less, from the viewpoint of light transmittability.

The haze value of the laminate of the disclosed embodiments can be measured in the same manner as the haze value of the polyimide film.

For the laminate of the disclosed embodiments, the birefringence index in the thickness direction at a wavelength of 590 nm, is preferably 0.020 or less, more preferably 0.015 or less, still more preferably 0.010 or less, and particularly preferably less than 0.008.

The birefringence index of the laminate of the disclosed embodiments can be measured in the same manner as the birefringence index in the thickness direction at a wavelength of 590 nm of the polyimide film.

5. Intended Application of Laminate

The intended application of the laminate of the disclosed embodiments is not particularly limited. For example, the laminate in the same applications as the polyimide film of the disclosed embodiments.

6. Method for Producing Laminate

As the method for producing the laminate of the disclosed embodiments, examples include, but are not limited to, a production method comprising the steps of forming, on at least one surface of the polyimide film of the disclosed embodiments, a coating film of a composition for forming hard coat layer, the composition containing at least one of a radically polymerizable compound and a cationically polymerizable compound, and curing the coating film.

The composition for forming hard coat layer contains at least one of a radically polymerizable compound and a cationically polymerizable compound. As needed, it may further contain a polymerization initiator, a solvent and additives.

As the radically polymerizable compound, cationically polymerizable compound, polymerization initiator and additives contained in the composition for forming hard coat layer, those described above under "2. Hard coat layer" may be used. The solvent may be appropriately selected from known solvents and used.

As the method for forming a coating film of the composition for forming hard coat layer on at least one surface of the polyimide film, examples include, but are not limited to, applying the composition for forming hard coat layer by a known applying means on at least one surface of the polyimide film.

The applying means is not particularly limited, as long as it is a means that can apply the composition to a desired film thickness. As the applying means, examples include, but are not limited to, the same means as those described above as the means for applying the polyimide precursor resin composition to the support.

As needed, a coating film of the curable resin composition for hard coat layer is dried for removal of the solvent. As the drying method, examples include, but are not limited to, drying under reduced pressure, heat drying, and a combination thereof. In the case of drying the composition under normal pressure, it is preferable to dry the composition at a temperature of 30° C. or more and 110° C. or less.

A coating film is obtained by applying the curable resin composition for hard coat layer and, as needed, drying the applied composition. Depending on the polymerizable groups of the radically polymerizable compound and cationically polymerizable compound contained in the curable resin composition, the thus-obtained coating film is cured by at least one of light irradiation and heating, whereby a hard coat layer containing a polymer of at least one of a radically polymerizable compound and a cationically polymerizable compound, can be formed on at least one surface of the polyimide film.

For light irradiation, mainly, ultraviolet rays, visible light, electron beams, ionizing radiation or the like are used. In the case of UV curing, ultraviolet rays emitted from an ultra-high-pressure mercury lamp, a high-pressure mercury lamp, a low-pressure mercury lamp, a carbon arc lamp, a xenon arc lamp, a metal halide lamp or the like are used. The energy ray dose of the source is about 50 mJ/cm$^2$ to 5000 mJ/cm$^2$, which is an accumulated dose at an UV wavelength of 365 nm.

In the case of heating, the applied composition is generally heated at a temperature of 40° C. or more and 120° C. or less. Also, curing reaction may be carried out by leaving the coating film for at least 24 hours in a room temperature environment (25° C.)

III. Surface Material for Display

The surface material for display according to the disclosed embodiments, is the polyimide film according to the disclosed embodiments, or the laminate according to the disclosed embodiments.

To use the surface material for display of the disclosed embodiments, it is disposed so as to be located on the surface of various kinds of displays. As with the above-described polyimide film and laminate of the disclosed embodiments, the surface material for display of the disclosed embodiments has increased flex resistance and enough surface hardness as a protection film. Therefore, it can be especially suitably used as a surface material for flexible display. Moreover, as with the above-described polyimide film and laminate of the disclosed embodiments, the surface material for display of the disclosed embodiments has reduced optical distortion. Therefore, it can suppress a reduction in displaying quality of displays.

The surface material for display of the disclosed embodiments can be used in various kinds of known displays and is not particularly limited. For example, it can be used in displays described above under "6. Intended application of polyimide film"

When the surface material for display of the disclosed embodiments is the laminate of the disclosed embodiments, the polyimide film-side surface or the hard coat layer-side surface may come to the top surface after the laminate is disposed on the display surface. It is particularly preferable to dispose the surface material for display of the disclosed embodiments so that the hard coat layer-side surface comes close to the top. The outermost surface of the surface material for display of the disclosed embodiments may be an anti-fingerprint layer.

The method for disposing the surface material for display of the disclosed embodiments is not particularly limited. As the method, examples include, but are not limited to, attaching the surface material to the display surface via an adhesive layer. As the adhesive layer, a conventionally known adhesive layer that can be used to attach the surface material for display, can be used.

EXAMPLES

[Evaluation Methods]
<Weight Average Molecular Weight of Polyimide Precursor>

The weight average molecular weight of the polyimide precursor was measured as follows. The polyimide precursor was formed into an N-methylpyrrolidone (NMP) solution in a concentration of 0.5 wt %. A 10 mmol % LiBr-NMP solution having a water content of 500 ppm or less, was used as a developing solvent. A GPC device ("HLC-8120" manufactured by Tosoh Corporation) and columns ("GPC LF-804" manufactured by SHODEX) were used. The measurement was carried out in the condition of an injected sample amount of 50 µL, a solvent flow rate of 0.4 mL/min, and a temperature of 40° C. The weight average molecular weight of the polyimide precursor was obtained on the basis of a polystyrene standard sample in the same concentration as the sample.

<Viscosity of Polyimide Precursor Solution>

The viscosity of the polyimide precursor solution was measured by a viscometer (such as "TVE-22HT" manufactured by Toki Sangyo Co., Ltd.) at 25° C., using the sample in an amount of amount of 0.8 ml.

<Weight Average Molecular Weight of Polyimide>

The weight average molecular weight of the polyimide was measured as follows. The polyimide was formed into an N-methylpyrrolidone (NMP) solution in a concentration of 0.2 wt %. A 30 mmol % LiBr-NMP solution having a water content of 500 ppm or less, was used as a developing solvent. A GPC device ("HLC-8120" manufactured by Tosoh Corporation) and columns ("GPC LF-804" manufactured by SHODEX) were used. The measurement was carried out in the condition of an injected sample amount of 50 µL, a solvent flow rate of 0.4 mL/min, and a temperature of 40° C. The weight average molecular weight of the polyimide was obtained on the basis of a polystyrene standard sample in the same concentration as the sample.

<Viscosity of Polyimide Solution>

The viscosity of the polyimide solution was measured by a viscometer (such as "TVE-22HT" manufactured by Toki Sangyo Co., Ltd.) at 25° C., using the sample in an amount of amount of 0.8 ml.

<Silicon Atom Content Ratio (Mass %) of Polyimide>

The silicon atom content ratio (mass %) of the polyimide was calculated from the molecular weights of raw materials.

For example, it can be calculated as follows when, like the polyimide of Example 1, 0.9 mol of 2,2'-bis(trifluoromethyl)benzidine (TFMB) and 0.1 mol of 1,3-bis(3-aminopropyl)tetramethyldisiloxane (AprTMOS) are used as a diamine component, with respect to 1 mol of 4,4'-(hexafluoroisopropylidene)diphthalic anhydride (6FDA) as an acid dianhydride component.

For the molecular weight of per mol of the polyimide repeating unit,

Molecular weight derived from 6FDA:
(C) $12.01 \times 19$ + (F) $19.00 \times 6$ + (O) $16.00 \times 4$ + (H) $1.01 \times 6 = 412.25$ Molecular weight derived from TFMB:
{(C) $12.01 \times 14$ + (F) $19.00 \times 6$ + (N) $14.01 \times 2$ + (H) $1.01 \times 6$} $\times 0.9 = 284.60$ Molecular weight derived from AprTMOS:
{(C) $12.01 \times 10$ + (O) $16.00 \times 1$ + (N) $14.01 \times 2$ + (Si) $28.09 \times 2$ + (H) $1.01 \times 24$} $\times 0.1 = 24.45$ From the above molecular weights, the molecular weight of per mol of the polyimide repeating unit was calculated to be 721.30 (=412.25+284.60+24.45).

Therefore, the silicon atom content ratio (mass %) per mol of the polyimide repeating unit is obtained as follows: $(28.09 \times 2 \times 0.1)/721.30 \times 100 = 0.8$ (mass %).

For the both-amine-terminated diphenyl silicone oil ("X22-1660B-3" manufactured by Shin-Etsu Chemical Co., Ltd., side-chain: phenyl type, number average molecular weight: 4400) of Comparative Example 3, the silicon atom content ratio (mass %) was calculated as follows: on the assumption that amino groups were bound to silicone through—$(CH_2)_3$—, from the number average molecular weight of 4400, the repeating unit number of diphenylsiloxane was calculated to be an average of 19.7, and an average of 21.7 silicon atoms were estimated to be contained per molecule.

For the silicone diamine ("KF-8010" manufactured by Shin-Etsu Chemical Co., Ltd., number average molecular weight: 860) of Comparative Example 4, the silicon atom content ratio (mass %) was calculated as follows: on the assumption that amino groups were bound to silicone through—$(CH_2)_3$—, from the number average molecular weight of 860, the repeating unit number of dimethylsiloxane was calculated to be an average of 8.2, and an average of 10.2 silicon atoms were estimated to be contained per molecule.

<Total Light Transmittance>

The total light transmittance was measured by a haze meter ("HM150" manufactured by Murakami Color Research Laboratory Co., Ltd.) in accordance with JIS K7361-1.

For example, the total light transmittance at a thickness of 100 µm can be converted by the Beer-Lambert law.

In particular, according to the Beer-Lambert law, a transmittance T is represented by $Log_{10}(1/T) = kcb$ (where k=a substance-specific constant, c=concentration, b=optical path length).

In the case of the transmittance of a film, if it is assumed that the density is constant even when the film thickness changes, c is a constant, too. Therefore, using a constant f, the above formula can be represented by $Log_{10}(1/T) = fb$ (where f=kc). The constant f, which is specific to each substance, can be obtained if the transmittance of the film at a certain film thickness is found. Therefore, the transmittance of the film at a desired film thickness can be obtained by using the formula $T = 1/10^{fb}$ and plugging the obtained specific constant in f and a desired film thickness in b.

<YI value (yellowness index)>

The YI value was calculated from a transmittance measured by the spectrophotometric colorimetry defined in JIS Z8722, with the use of an UV-Vis-NIR spectrophotometer ("V-7100" manufactured by JASCO Corporation) in accordance with JIS K7373-2006.

For example, a YI value at a thickness of 100 µm can be calculated as follows and used: for transmittances at wavelengths measured at intervals of 5 nm from 380 nm and 780 nm for a sample having a specific film thickness, corresponding values of the transmittances at the wavelengths for a different thickness are obtained by the Beer-Lambert law in the same manner as the above-described total light transmittance, and the YI value at a thickness of 100 µm is calculated from the corresponding values.

<Haze Value>

The haze value was measured by a haze meter ("HM150" manufactured by Murakami Color Research Laboratory Co., Ltd.) in accordance with JIS K-7105.

<Birefringence Index>

Using a retardation measurement device ("KOBRA-WR" manufactured by Oji Scientific Instruments), the thickness-direction retardation value (Rth) of the polyimide film was measured at 25° C. by a light with a wavelength of 590 nm. The thickness-direction retardation value (Rth) was obtained as follows: the retardation value of incidence at an angle of 0 degrees and the retardation value of incidence at an oblique angle of 40 degrees were measured, and the thickness-direction retardation value Rth was calculated from these retardation values. The retardation value of incidence at an oblique angle of 40 degrees was measured by making a light with a wavelength of 590 nm incident to a retardation film from a direction inclined at an angle of 40 degrees from the normal line of the retardation film.

The birefringence index of the polyimide film was obtained by plugging the obtained value in the following formula: Rth/d (where d is the film thickness (nm) of the polyimide film).

<Glass Transition Temperature>

Dynamic viscoelasticity measurement was carried out by dynamic viscoelasticity measuring apparatus "RSA III" (manufactured by TA Instruments Japan) in the conditions of a measurement range of from −150° C. to 400° C., a frequency of 1 Hz, a temperature increase rate of 5° C./min, a sample width of 5 mm and a chuck distance of 20 mm. From the peak temperature of tan δ (tan δ=loss elastic modulus (E")/storage elastic modulus (E')), a glass transition temperature (Tg) was obtained.

<Tensile Elastic Modulus>

The humidity of a polyimide film test piece cut to a size of 15 mm×40 mm, was controlled in the conditions of a temperature of 25° C. and a relative humidity of 60% for two hours. Then, for the test piece, the tensile elastic modulus at 25° C. was measured at a tensile rate of 10 mm/min and a chuck distance of 20 mm in accordance with JIS K7127. As a tensile tester, "AUTOGRAPH AG-X 1N" (manufactured by Shimadzu Corporation, load cell: SBL-1KN), was used.

<Young's Modulus>

The Young's modulus of the surface of a polyimide film test piece cut to a size of 15 mm×15 mm, was measured at a temperature of 25° C., by the nanoindentation method in accordance with ISO14577. More specifically, "PICODENTOR HM500" (manufactured by Fischer Instruments K.K.) was used as a measurement device, and a Vickers indenter was used as a measurement indenter. Any 8 points on the test piece surface was measured, and the average of the measured values was obtained and determined as the Young's modulus. The measurement conditions were a maximum indentation depth of 1000 nm, a weighted time of 20 seconds, and a creep time of 5 seconds.

<Static Bending Test>

Figure 2:
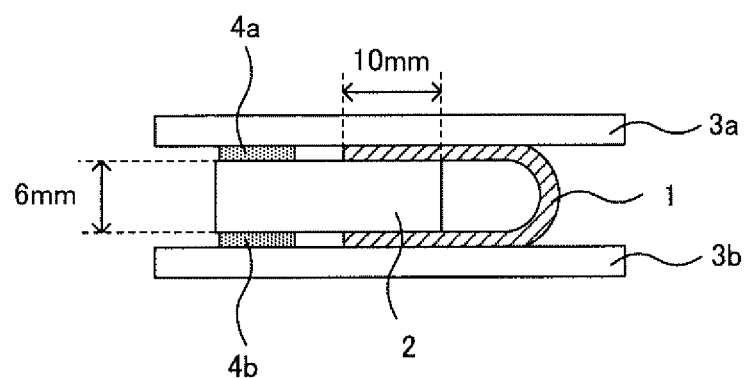
FIG. 2 is an explanatory diagram of a static bending test method.

Hereinafter, the static bending test method will be described with reference to FIG. 2.

A polyimide film test piece 1 cut to a size of 15 mm×40 mm, was bent at a position half the long side so that both long side ends of the polyimide film test piece 1 sandwiched upper and lower surfaces of a metal piece 2 having a thickness of 6 mm (100 mm×30 mm×6 mm); they were fixed by tape so that an overlapping margin of each end of the polyimide film test piece 1 with the upper or lower surface of the metal piece 2, was 10 mm; the metal piece 2 and the fixed polyimide film test piece 1 were sandwiched between glass plates 3a and 3b (100 mm×100 mm×0.7 mm) to fix the polyimide film test piece 1 in a state of being bent with an inner diameter of 6 mm; at this time, dummy test pieces 4a and 4b were each interposed into a part where the polyimide film test piece 1 was not present on the metal piece 2, and the glass plates 3a and 3b were fixed parallel to one another by tape.

The polyimide film test piece bent and fixed in this state, was left to stand for 24 hours in a relative humidity (RH) environment of 60° C.±2° C. and 93%±2%. Then, the glass plates and the test piece fixing tape were removed to release force applied to the polyimide film test piece. Then, one end of the test piece was fixed, and the interior angle of the polyimide film test piece 30 minutes after the release of the applied force, was measured.

When the film was completely restored without any influence after the static bending test, the interior angle was 180°.

<Dynamic Bending Test>

A polyimide film test piece cut to a size of 20 mm×100 mm, was fixed on an endurance testing system in a constant temperature and humidity chamber ("TENSION-FREE U-SHAPE FOLDING TEST JIG DMX-FS" for planar objects, manufactured by Yuasa System Co., Ltd.) by tape. The test piece was set to be in the same folded state as the static bending test, that is, the test piece was set so that the distance between both of the long side ends of the folded test piece was 6 mm. Then, the test piece was repeatedly bent 200,000 times, at a rate of 90 times/minute, in the environment at a temperature of 60° C.±2° C. and a relative humidity (RH) of 93%±2%, or in the environment at a temperature of 25° C.±2° C. and a relative humidity (RH) of 50%±10%.

Then, 30 minutes after removing the test piece, one end of the removed test piece was fixed, and the interior angle of the test piece was measured.

When the film was completely restored without any influence after the dynamic bending test, the interior angle was 180°.

<Pencil Hardness>

Pencil hardness was evaluated as follows. First, the humidity of a measurement sample was controlled for two hours in the conditions of a temperature of 25° C. and a relative humidity of 60%. Then, using pencils defined in JIS-S-6006 and a pencil scratch hardness tester manufactured by Toyo Seiki Seisaku-sho, Ltd., the pencil hardness test defined in JIS K5600-5-4 (1999) was carried out on the surface of the sample film (at a load of 0.98 N), thereby evaluating the highest pencil hardness that left no scratch on the surface.

<Adhesion Evaluation>

For adhesion evaluation, a resin composition for hard coat layer was prepared by adding 1-hydroxy-cyclohexyl-phenyl-ketone ("IRGACURE 184" manufactured by BASF) to a 40 mass % methyl isobutyl ketone solution of pentaerythritol triacrylate so that 10 parts by mass of 1-hydroxy-cyclohexyl-phenyl-ketone was added with respect to 100 parts by mass of pentaerythritol triacrylate. The resin composition for hard coat layer was applied on a polyimide film test piece cut to a size of 10 cm×10 cm, and the applied resin composition was cured by exposure to ultraviolet light at an exposure amount of 200 mJ/cm$^2$ under a nitrogen flow to form a cured film with a film thickness of 10 µm, thereby producing a laminate. The cross-cut test in accordance with JIS K 5600-5-6 was carried out on the cured film, and peeling operation by tape was repeatedly carried out thereon, 5 times. Then, the coating film was observed to see if there was a presence or absence of peeling. The coating film was evaluated in accordance with the following evaluation criteria.

A: The coating film was not peeled off even after the peeling operation by tape was repeatedly carried out 5 times.

B: The coating film was not peeled off after the peeling operation by tape was repeatedly carried out one time; however, the coating film was peeled off until the peeling operation by tape was repeatedly carried out 5 times.

C: The coating film was entirely peeled off along the edge of the cut, after the peeling operation by tape was carried out one time.

Synthesis Example 1

In a 500 ml separable flask, a solution obtained by dissolving 302.0 g of dehydrated dimethylacetamide and 2.49 g (10 mmol) of 1,3-bis(3-aminopropyl)tetramethyldisiloxane (AprTMOS), was controlled at a solution temperature of 30° C. Next, 2.22 g (5 mmol) of 4,4'-(hexafluoroisopropylidene)diphthalic anhydride (6FDA) was gradually added thereto so that an increase in temperature was 2° C. or less. The thus-obtained mixture was stirred for 4 hours with a mechanical stirrer. Then, 28.8 g (90 mmol) of 2,2'-bis(trifluoromethyl)benzidine (TFMB) was added thereto. After complete dissolution of the TFMB was confirmed, 42.0 g (94.5 mmol) of 4,4'-(hexafluoroisopropylidene)diphthalic anhydride (6FDA) was gradually added to the mixture in batches so that an increase in temperature was 2° C. or less, thereby synthesizing a polyimide precursor solution 1 (solid content 20 wt %) in which the polyimide precursor 1 was dissolved. The TFMB and AprTMOS used in the polyimide precursor 1 were at a molar ratio of 90:10. The viscosity of the polyimide precursor solution 1 (solid content 20 wt %) at 25° C. was 40150 cps. The weight average molecular weight of the polyimide precursor 1 measured by GPC, was 253000.

Synthesis Examples 2 to 6

Polyimide precursor solutions 2 to 6 were obtained by carrying out a reaction in the same manner as Synthesis Example 1, in accordance with the raw materials and solid content concentrations listed in Table 1.

Comparative Synthesis Example 1

In a 500 ml separable flask, a solution obtained by dissolving 345.3 g of dehydrated dimethylacetamide and 49.7 g (200 mmol) of 1,3-bis(3-aminopropyl)tetramethyldisiloxane (AprTMOS), was controlled at a solution temperature of 30° C. Next, 88.4 g (199 mmol) of 4,4'-(hexafluoroisopropylidene)diphthalic anhydride (6FDA) was gradually added thereto so that an increase in temperature was 2° C. or less, thereby synthesizing a comparative polyimide precursor solution 1 (solid content 40 wt %) in which the comparative polyimide precursor 1 was dissolved. The viscosity of the comparative polyimide precursor solution 1 (solid content 40 wt %) at 25° C. was 3900 cps. The weight average molecular weight of the comparative polyimide precursor 1 measured by GPC, was 42000.

Hereinafter, the meaning of abbreviations shown in the following tables are as follows.

TFMB: 2,2'-Bis(trifluoromethyl)benzidine
AprTMOS: 1,3-Bis(3-aminopropyl)tetramethyldisiloxane
BAPS-M: Bis[4-(3-aminophenoxy)phenyl]sulfone
6FDA: 4,4'-(Hexafluoroisopropylidene)diphthalic anhydride
PMDA: Pyromellitic dianhydride
sBPDA: 3,3',3,4'-Biphenyltetracarboxylic dianhydride

TABLE 1

| | Diamine 1 (containing no Si) | Diamine 2 (containing Si) | Molar ratio of Diamine 1 to Diamine 2 | Acid dianhydride | Solid content concentration (wt %) | Viscosity (cps) | Weight average molecular weight |
|---|---|---|---|---|---|---|---|
| Polyimide precursor solution 1 | TFMB | AprTMOS | 90:10 | 6FDA | 20 | 40150 | 253000 |
| Polyimide precursor solution 2 | TFMB | AprTMOS | 85:15 | 6FDA | 25 | 17770 | 117000 |
| Polyimide precursor solution 3 | TFMB | AprTMOS | 80:20 | 6FDA | 25 | 10180 | 109000 |
| Polyimide precursor solution 4 | TFMB | AprTMOS | 70:30 | 6FDA | 25 | 10030 | 115000 |
| Polyimide precursor solution 5 | TFMB | AprTMOS | 60:40 | 6FDA | 30 | 17300 | 86000 |
| Polyimide precursor solution 6 | TFMB | AprTMOS | 50:50 | 6FDA | 30 | 2500 | 53000 |
| Comparative polyimide precursor solution 1 | — | AprTMOS | 0:100 | 6FDA | 40 | 3900 | 42000 |

Examples 1 to 6, Comparative Example 1

Polyimide films having a thickness of 50 μm±5 μm, were produced by use of the polyimide precursor solutions 1 to 6 and the comparative polyimide precursor solution 1, by the following steps (1) to (3).

(1) The polyimide precursor solution was applied onto glass and dried in a circulation oven at 120° C. for 10 minutes.

(2) Under a nitrogen flow (oxygen concentration 100 ppm or less), the dried sample was heated to 350° C. at a temperature increase rate of 10° C./min, kept at 300° C. for one hour, and then cooled down to room temperature.

(3) The polyimide film thus produced was removed from the glass.

The thus-obtained polyimide films were evaluated by the above-mentioned evaluation methods. The evaluation results are shown in Table 2.

TABLE 2

| | Example 1 | Example 2 | Example 3 | Example 4 | Example 5 | Example 6 | Comparative Example 1 |
|---|---|---|---|---|---|---|---|
| Polyimide precursor | Polyimide precursor 1 | Polyimide precursor 2 | Polyimide precursor 3 | Polyimide precursor 4 | Polyimide precursor 5 | Polyimide precursor 6 | Comparative polyimide precursor 1 |
| Molar ratio (mol %) of diamine containing Si | 10 | 15 | 20 | 30 | 40 | 50 | 100 |
| Mass ratio (wt %) of Si | 0.8 | 1.2 | 1.6 | 2.4 | 3.2 | 4.1 | 8.6 |
| Film thickness (μm) | 45 | 55 | 45 | 50 | 51 | 45 | 46 |
| Total light transmittance (%) | 90.6 | 90.8 | 90.8 | 90.5 | 90.2 | 89.1 | 88 |
| YI | 2.2 | 2.1 | 2.1 | 2.7 | 4.5 | 15.6 | 35.2 |
| Haze | 0.6 | 0.6 | 0.3 | 0.3 | 0.6 | 11.6 | 2 |
| Birefringence index in film thickness direction | 0.004 | 0.003 | 0.003 | 0.002 | 0.002 | 0.0009 | 0.001 |
| Tg (° C.) | 312 | 288 | 270 | 238 | 211 | 196 | 98 |
| Tensile elastic modulus (GPa) | 2.8 | 2.6 | 2.5 | 2.6 | 2.6 | 1.9 | 1.5 |
| Young's modulus (GPa) | 3.4 | 3.3 | 3.4 | 3.3 | 3.1 | 2.5 | 2.1 |
| Dynamic bending test (°) (60° C., 93% RH) | 170 | 160 | 170 | 160 | 160 | 165 | 50 |
| Dynamic bending test (°) (25° C., 50% RH) | 180 | 180 | 180 | 180 | 180 | 175 | 170 |
| Static bending test (°) (60° C., 93% RH) | 125 | 120 | 130 | 120 | 130 | 135 | 0 |
| Pencil hardness | HB | H | H | HB | HB | HB | 6B |
| Adhesion | B | A | A | A | A | A | A |

Synthesis Example 7

A polyimide precursor solution 7 was synthesized in the same manner as Synthesis Example 1, except that in place of 2,2'-bis(trifluoromethyl)benzidine (TFMB), an equimolar amount of bis[4-(3-aminophenoxy)phenyl]sulfone (BAPS-M) was used, and the solid content concentration was controlled to 30 wt %. The viscosity of the thus-obtained polyimide precursor solution at 25° C. and the weight average molecular weight of the polyimide precursor are shown in Table 3.

TABLE 3

|  | Diamine 1 (containing no Si) | Diamine 2 (containing Si) | Molar ratio of Diamine 1 to Diamine 2 | Acid dianhydride | Solid content concentration (wt %) | Viscosity (cps) | Weight average molecular weight |
|---|---|---|---|---|---|---|---|
| Polyimide precursor solution 1 | TFMB | AprTMOS | 90:10 | 6FDA | 20 | 40150 | 253000 |
| Polyimide precursor solution 7 | BAPS-M | AprTMOS | 90:10 | 6FDA | 30 | 35300 | 86779 |

Synthesis Example 8

A polyimide precursor solution 8 was synthesized in the same manner as Synthesis Example 6, except that in place of 4,4'-(hexafluoroisopropylidene)diphthalic anhydride (6FDA), an equimolar amount of acid dianhydride component shown in Table was used. The viscosity of the thus-obtained polyimide precursor solution 8 (solid content 30 wt %) at 25° C. and the weight average molecular weight of the polyimide precursor 8 are shown in Table 4.

Synthesis Example 9

In a 500 ml separable flask, a solution obtained by dissolving 169.5 g of dehydrated dimethylacetamide, 12.4 g (50 mmol) of 1,3-bis(3-aminopropyl)tetramethyldisiloxane (AprTMOS) and 16.0 g (50 mmol) of 2,2'-bis(trifluoromethyl)benzidine (TFMB), was controlled at a solution temperature of 30° C. Next, 44.2 g (99.5 mmol) of 4,4'-(hexafluoroisopropylidene)diphthalic anhydride (6FDA) was gradually added thereto in batches so that an increase in temperature was 2° C. or less, thereby synthesizing a polyimide precursor solution 9 (solid content 30 wt %) in which the polyimide precursor 9 was dissolved. The TFMB and AprTMOS used in the polyimide precursor 9 were at a molar ratio of 50:50. The viscosity of the polyimide precursor solution 9 at 25° C. was 5380 cps. The weight average molecular weight of the polyimide precursor 9 measured by GPC, was 62000.

TABLE 4

|  | Diamine 1 (containing no Si) | Diamine 2 (containing Si) | Molar ratio of Diamine 1 to Diamine 2 | Acid dianhydride | Solid content concentration (wt %) | Viscosity (cps) | Weight average molecular weight |
|---|---|---|---|---|---|---|---|
| Polyimide precursor solution 6 | TFMB | AprTMOS | 50:50 | 6FDA | 30 | 2500 | 53000 |
| Polyimide precursor solution 8 | TFMB | AprTMOS | 50:50 | sBPDA | 30 | 34200 | 54500 |
| Polyimide precursor solution 9 | TFMB | AprTMOS | 50:50 | 6FDA | 30 | 5380 | 62000 |

Examples 7 to 9

Polyimide films were produced by use of the polyimide precursor solutions 7 to 9, in the same manner as Example 1. The thus-obtained polyimide films were evaluated by the above-mentioned evaluation methods. The evaluation results are shown in Table 5. As a result of the glass transition temperature measurement, the polyimide film of Example 8 was found to have another small tan δ peak at around 250° C.

TABLE 5

|  | Example 7 | Example 8 | Example 9 |
|---|---|---|---|
| Polyimide precursor | Polyimide precursor 7 | Polyimide precursor 8 | Polyimide precursor 9 |
| Molar ratio (mol %) of diamine containing Si | 10 | 50 | 50 |
| Mass ratio (wt %) of Si | 0.7 | 6.2 | 4.1 |
| Film thickness (μm) | 48 | 48 | 45 |
| Total light transmittance (%) | 88.9 | 86.2 | 90.4 |
| YI | 5.3 | 15.1 | 4.5 |
| Haze | 0.6 | 0.9 | 0.3 |
| Birefringence index in film thickness direction | 0.0006 | 0.0075 | 0.0016 |
| Tg (° C.) | 239 | 199 | 186 |
| Tensile elastic modulus (GPa) | 2.5 | 2.4 | 2.6 |
| Dynamic bending test (°) (60° C., 93% RH) | Broken | 175 | Broken |
| Dynamic bending test (°) (25° C., 50% RH) | 180 | 180 | 180 |
| Static bending test (°) (60° C., 93% RH) | 150 | 120 | 135 |
| Pencil hardness | HB | HB | 2B |
| Adhesion | B | B | A |

Comparative Synthesis Example 2

While introducing nitrogen gas in a 3 L separable flask equipped with an oil bath and a stirrer, 12.25 g of both-amine-terminated diphenyl silicone oil ("X22-1660B-3" manufactured by Shin-Etsu Chemical Co., Ltd., number average molecular weight: 4400), 3432 g of N-methyl-2-pyrrolidone (NMP), and then 222.12 g (0.5 mol) of 6FDA were added to the flask. The mixture was stirred at room temperature for 30 minutes. Then, 152.99 g (0.478 mol) of 2,2'-bis(trifluoromethyl)benzidine (TFMB) was added thereto. After dissolution of the TFMB was confirmed, the mixture was stirred at room temperature for 3 hours. Then, the temperature of the mixture was increased to 80° C., and the mixture stirred for 4 hours. Then, the oil bath was removed from the flask to return the mixture temperature to room temperature, thereby obtaining a comparative polyimide precursor solution 2. For the comparative polyimide precursor solution 2, the solid content concentration, the viscosity at 25° C., and the weight average molecular weight of the comparative polyimide precursor 2 measured by GPC, are shown in Table 6.

Comparative Synthesis Example 3

In a 500 ml separable flask, a solution obtained by dissolving 169.5 g of dehydrated dimethylacetamide and 32.0 g (100 mmol) of 2,2'-bis(trifluoromethyl)benzidine (TFMB), was controlled at a solution temperature of 30° C. Next, 21.7 g (99.5 mmol) of pyromellitic dianhydride (PMDA) was gradually added thereto in batches so that an increase in temperature was 2° C. or less, thereby synthesizing a comparative polyimide precursor solution 3 (solid content 20 wt %) in which the comparative polyimide precursor 3 was dissolved. The viscosity of the comparative polyimide precursor solution 3 at 25° C. was 23400 cps. The weight average molecular weight of the comparative polyimide precursor 3 measured by GPC, was 82800.

TABLE 6

|  | Diamine 1 (containing no Si) | Diamine 2 (containing Si) | Molar ratio of Diamine 1 to Diamine 2 | Acid dianhydride | Solid content concentration (wt %) | Viscosity (cps) | Weight average molecular weight |
|---|---|---|---|---|---|---|---|
| Comparative polyimide precursor solution 2 | TFMB | X22-1660B-3 | 100:0.6 | 6FDA | 10 | 89 | 66900 |
| Comparative polyimide precursor solution 3 | TFMB | — | 100:0 | PMDA | 20 | 23400 | 82800 |

Comparative Examples 2 and 3

Polyimide films were produced by use of the comparative polyimide precursor solutions 2 and 3, in the same manner as Example 1. The thus-obtained polyimide films were evaluated by the above-mentioned evaluation methods. The evaluation results are shown in Table 7.

TABLE 7

|  | Comparative Example 2 | Comparative Example 3 |
|---|---|---|
| Polyimide precursor | Comparative polyimide precursor 2 | Comparative polyimide precursor 3 |
| Molar ratio (mol %) of diamine containing Si | 0.6 | 0 |
| Mass ratio (wt %) of Si | 0.5 | 0 |
| Film thickness (μm) | 45 | 49 |
| Total light transmittance (%) | 88.5 | 86.9 |
| YI | 6.8 | 31.2 |
| Haze | 1.1 | 1.2 |
| Birefringence index in film thickness direction | 0.0031 | 0.1173 |
| Tg (° C.) | 335 | 400 |
| Tensile elastic modulus (GPa) | 1.7 | 5.3 |
| Dynamic bending test (°) (60° C., 93% RH) | Broken | Broken |
| Dynamic bending test (°) (25° C., 50% RH) | 175 | 160 |
| Static bending test (°) (60° C., 93% RH) | 115 | 65 |
| Pencil hardness | 6B | H |
| Adhesion | C | C |

Tables 2, 5 and 7 show that the polyimide films of Examples 1 to 9, which correspond to the polyimide film of the disclosed embodiments, are resin films which have increased flex resistance (especially static flex resistance) and which suppress a reduction in surface hardness. The polyimide films of Examples 1 to 9 are also excellent in adhesion to hard coat layer.

Meanwhile, as a result of the static bending test, the polyimide film of Comparative Example 1 showed a 0 degree angle, and it was inferior in flex resistance to the extent that bending tendency formed by the static bending test was left on the film and the film could not return to the original state. Also, the polyimide film was very inferior in pencil hardness.

The polyimide film of Comparative Example 2 was inferior in static flex resistance, very inferior in pencil hardness, and poor in adhesion to hard coat layer. The polyimide film of Comparative Example 3 had a large elastic modulus and was excellent in surface hardness; however, it was inferior in flex resistance and poor in adhesion to hard coat layer.

Example 10

(1) Preparation of Polyimide (Chemical Imidization)

In a 500 ml separable flask, a solution obtained by dissolving dehydrated dimethylacetamide (300.0 g) and 1,3-bis(3-aminopropyl)tetramethyldisiloxane (AprTMOS) (3.83 g, 15 mmol), was controlled at a solution temperature of 30° C. Next, 4,4'-(hexafluoroisopropylidene)diphthalic anhydride (6FDA) (3.42 g, 7.7 mmol) was gradually added thereto so that an increase in temperature was 2° C. or less. The thus-obtained mixture was stirred for one hour with a mechanical stirrer. Then, 2,2'-bis(trifluoromethyl)benzidine (TFMB) (44.4 g, 139 mmol) was added thereto. After complete dissolution of the TFMB was confirmed, 4,4'-(hexafluoroisopropylidene)diphthalic anhydride (6FDA) (64.7 g, 146 mmol) was gradually added to the mixture in batches so that an increase in temperature was 2° C. or less, thereby synthesizing a polyimide precursor solution 1' (solid content 28 wt %) in which the polyimide precursor 1' was dissolved.

The temperature of the solution was decreased to room temperature. Dehydrated dimethylacetamide (165.3 g) was added to the solution, and the solution was stirred until it became uniform. Next, as a catalyst, pyridine (48.5 g, 613 mmol) and acetic anhydride (62.6 g, 613 mol) were added to the solution, and the solution was stirred for 24 hours at room temperature, thereby synthesizing a polyimide solution. The thus-obtained polyimide solution (346.4 g) was transferred to a 5 L separable flask. Butyl acetate (235.3 g) was added to the solution, and the solution was stirred until it became uniform. Next, methanol (523.5 g) was gradually added thereto, thereby obtaining a slightly turbid solution. Methanol (1.221 kg) was added to the turbid solution at once, thereby obtaining a white slurry. The slurry was filtered and washed 5 times with methanol, thereby obtaining a polyimide 1 (65.8 g). The weight average molecular weight of the polyimide measured by GPC, was 125000.

(2) Production of Polyimide Film

The polyimide 1 was dissolved in a mixed solvent of butyl acetate and PGMEA (at a volume ratio of 8:2) to produce a polyimide solution 1 having a solid content of 25 mass %. The viscosity of the polyimide solution 1 (solid content 25 wt %) at 25° C. was 21630 cps.

A polyimide film having a thickness of 50 μm±5 μm, was produced by use of the above-obtained polyimide solution 1, by the following steps (i) to (iii).

(i) The polyimide solution 1 was applied onto glass and dried in a circulation oven at 120° C. for 10 minutes.

(ii) Under a nitrogen flow (oxygen concentration 100 ppm or less), the dried sample was heated to 250° C. at a temperature increase rate of 10° C./min, kept at 250° C. for one hour, and then cooled down to room temperature.

(iii) The polyimide film thus produced was removed from the glass.

Examples 11 and 12

(1) Preparation of Polyimides (Chemical Imidization)

Polyimides 2 and 3 were obtained by carrying out a reaction in the same manner as the synthesis of the polyimide of Example 10, at diamine ratios shown in Table 8.

(2) Production of Polyimide Films

Polyimide solutions 2 and 3 shown in Table 8 were obtained in the same manner as Example 10, except that the polyimides 2 and 3 were used in place of the polyimide 1, and the polyimide solutions were controlled to have solid content concentrations shown in Table 8.

Polyimide films of Examples 11 and 12 were obtained in the same manner as Example 10, except that the polyimide solutions 2 and 3 were used in place of the polyimide solution 1.

Comparative Example 4

(1) Preparation of Comparative Polyimide 1 (Chemical Imidization)

Dehydrated dimethylformamide (144.0 g) and 2,2-bis-[4-(4-aminophenoxy)phenyl]-1,1,1,3,3,3-hexafluoropropane (HFBAPP) (31.2 g, 60 mmol) were added to a 500 ml separable flask and stirred until they were completely dissolved. The thus-obtained solution was cooled to 0° C. Then, 4,4'-(hexafluoroisopropylidene)diphthalic anhydride (6FDA) (39.9 g, 90 mmol) was gradually added to the solution, and the solution was stirred until the 6FDA was dissolved. Next, silicone diamine "KF-8010" (manufactured by Shin-Etsu Silicones, molecular weight: 860) (24.9 g, 30 mmol) was added to the solution, and the solution was stirred for 4 hours, thereby obtaining a polyamide acid solution. Next, as a catalyst, β-picoline (8.4 g, 90 mmol) and acetic anhydride (55.2 g, 540 mmol) was added to the solution, and the solution was stirred in an oil bath at 100° C. for one hour, thereby obtaining a polyimide solution. The thus-obtained polyimide solution was added in a dropwise manner to a large amount of isopropyl alcohol (IPA) to precipitate polyimide. The polyimide was obtained by filtration-extraction and washed by stirring in IPA. The polyimide was filtered again and then sufficiently dried under reduced pressure at 80° C., thereby obtaining a comparative polyimide 1. The weight average molecular weight of the comparative polyimide 1 measured by GPC, was 199000.

(2) Production of Comparative Polyimide Film

The comparative polyimide 1 was dissolved in dimethylformamide (DMF) to obtain a comparative polyimide solution 1 having a solid content of 30 mass %. The viscosity of the comparative polyimide solution 1 (solid content 30 wt %) at 25° C. was 48630 cps. A polyimide film having a thickness of 50 μm±5 μm was produced by mixing the comparative polyimide solution 1 with the comparative polyimide 1 so as to have a solid content of 33.3 wt %, and by the following steps (iv) and (v).

(iv) The comparative polyimide solution 1 was applied onto glass and dried in a circulation oven at 80° C. for 15 minutes and then dried in the oven at 250° C. for 5 minutes.

(v) The polyimide film thus produced was removed from the glass.

The thus-obtained polyimide films were evaluated by the above-mentioned evaluation methods. The results are shown in Table 9.

TABLE 9

|  | Example 10 | Example 11 | Example 12 | Comparative Example 4 |
|---|---|---|---|---|
| Polyimide precursor (chemically imidized) | Polyimide 1 | Polyimide 2 | Polyimide 3 | Comparative polyimide 1 |
| Molar ratio (mol %) of diamine containing Si | 10 | 20 | 50 | 33.3 |
| Mass ratio (wt %) of Si | 0.8 | 1.6 | 4.1 | 9.2 |
| Film thickness (μm) | 50 | 50 | 51 | 52 |
| Total light transmittance (%) | 90.7 | 90.6 | 90.8 | 89.3 |
| YI | 1.8 | 1.6 | 2.0 | 11.5 |
| Haze | 0.4 | 0.8 | 0.8 | 2.0 |
| Birefringence index in film thickness direction | 0.020 | 0.014 | 0.001 | 0.005 |
| Tg (° C.) | 311 | 277 | 193 | 258 |
| Tensile elastic modulus (GPa) | 2.4 | 2.3 | 2.0 | 1.6 |
| Young's modulus (GPa) | 2.9 | 2.7 | 2.4 | 2.2 |
| Dynamic bending test (°) (60° C., 93% RH) | 175 | 180 | 180 | 180 |
| Dynamic bending test (°) (25° C., 50% RH) | 180 | 175 | 180 | 180 |
| Static bending test (°) (60° C., 93% RH) | 125 | 130 | 130 | 160 |
| Pencil hardness | H | H | F | 3B |

Table 9 shows that the polyimide films of Examples 10 to 12, which correspond to the polyimide film of the disclosed

TABLE 8

|  | Diamine 1 (containing no Si) | Diamine 2 (containing Si) | Molar ratio of Diamine 1 to Diamine 2 | Acid dianhydride | Solid content concentration (wt %) | Viscosity (cps) | Weight average molecular weight |
|---|---|---|---|---|---|---|---|
| Polyimide solution 1 | TFMB | AprTMOS | 90:10 | 6FDA | 25 | 21630 | 125000 |
| Polyimide solution 2 | TFMB | AprTMOS | 80:20 | 6FDA | 28 | 88200 | 135000 |
| Polyimide solution 3 | TFMB | AprTMOS | 50:50 | 6FDA | 40 | 25200 | 63000 |
| Comparative polyimide solution 1 | HFBAPP | KF-8010 | 66.7:33.3 (2:1) | 6FDA | 30 | 48630 | 199000 | embodiments, are resin films which have increased flex resistance and which suppress a reduction in surface hardness.

Meanwhile, the polyimide film of Comparative Example 4 was excellent in flex resistance; however, it was inferior in pencil hardness, and the surface was easily scratched.

The invention claimed is:

1. A polyimide film comprising a polyimide containing a structure represented by the following general formula (1),
wherein a total light transmittance measured in accordance with JIS K7361-1 is 85% or more;
wherein a yellowness index calculated in accordance with JIS K7373-2006 is 30 or less;
wherein a glass transition temperature is in a temperature range of from 150° C. to 400° C.; and
wherein a tensile elastic modulus at 25° C. obtained by measuring a 15 mm×40 mm test piece at a tensile rate of 10 mm/min and a chuck distance of 20 mm in accordance with JIS K7127, is 1.8 GPa or more:

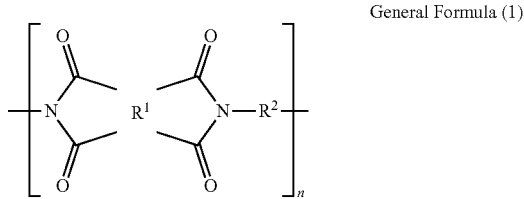

General Formula (1)

where $R^1$ is a tetravalent group that is a tetracarboxylic acid residue containing an aromatic ring or aliphatic ring; $R^2$ is a divalent group that is a diamine residue; 10 mol % to 50 mol % of total $R^2$s are diamine residues each in which a total number of silicon atoms in a main chain thereof is one or two, and 50 mol % to 90 mol % of total $R^2$s are diamine residues each containing no silicon atom and containing an aromatic ring or aliphatic ring; and n is a number of repeating units.

2. The polyimide film according to claim 1, wherein a birefringence index in the thickness direction at a wavelength of 590 nm, is 0.020 or less.

3. The polyimide film according to claim 1, wherein, when a static bending test is carried out in accordance with the following static bending test method, an interior angle measured by the test is 120° or more:

[Static bending test method]

A polyimide film test piece cut to a size of 15 mm×40 mm, is bent at a position half the long side so that both long side ends of the polyimide film test piece sandwich upper and lower surfaces of a metal piece having a thickness of 6 mm (100 mm×30 mm×6 mm); they are fixed by tape so that an overlapping margin of each end of the polyimide film test piece with the upper or lower surface of the metal piece, is 10 mm; while being in this state, the metal piece and the fixed polyimide film test piece are sandwiched between glass plates (100 mm×100 mm×0.7 mm) to fix the polyimide film test piece in a state of being bent with an inner diameter of 6 mm; at this time, dummy test pieces are each interposed into a part where the polyimide film test piece is not present between the metal piece and either one of the glass plates, and the glass plates are fixed parallel to one another by tape; the polyimide film test piece bent and fixed in this state, is left to stand for 24 hours in a relative humidity (RH) environment of 60° C.±2° C. and 93%±2%; then, the glass plates and the fixing tape are removed to release force applied to the polyimide film test piece; then, one end of the test piece is fixed, and the interior angle of the polyimide film test piece 30 minutes after the release of the applied force, is measured.

4. The polyimide film according to claim 1, wherein the polyimide containing the structure represented by the general formula (1) contains an aromatic ring and at least one selected from the group consisting of (i) a fluorine atom, (ii) an aliphatic ring and (iii) a structure comprising aromatic rings that are linked by a sulfonyl group or an alkylene group to which fluorine is optionally bound by substitution.

5. The polyimide film according to claim 1, wherein, for the polyimide containing the structure represented by the general formula (1), $R^1$ in the general formula (1) is at least one tetravalent group selected from the group consisting of a cyclohexanetetracarboxylic dianhydride residue, a cyclopentanetetracarboxylic dianhydride residue, a dicyclohexane-3,4,3',4'-tetracarboxylic dianhydride residue, a cyclobutanetetracarboxylic dianhydride residue, a pyromellitic dianhydride residue, a 3,3',4,4'-biphenyltetracarboxylic dianhydride residue, a 2,2',3,3'-biphenyltetracarboxylic dianhydride residue, a 4,4'-(hexafluoroisopropylidene)diphthalic anhydride residue, a 3,4'-(hexafluoroisopropylidene) diphthalic anhydride residue, a 3,3'-(hexafluoroisopropylidene)diphthalic anhydride residue, a 4,4'-oxydiphthalic anhydride residue, and a 3,4'-oxydiphthalic anhydride residue.

6. The polyimide film according to claim 1, wherein, for the polyimide containing the structure represented by the general formula (1), the diamine residue containing no silicon atom and containing an aromatic ring or aliphatic ring, which is $R^2$ in the general formula (1), is at least one divalent group selected from the group consisting of a trans-cyclohexanediamine residue, a trans-1,4-bismethylenecyclohexane diamine residue, a 4,4'-diaminodiphenylsulfone residue, a 3,4'-diaminodiphenylsulfone residue, a 2,2-bis(4-aminophenyl)propane residue, a 2,2-bis(4-aminophenyl)hexafluoropropane residue, and a divalent group represented by the following general formula (2):

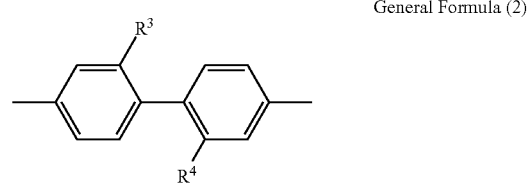

General Formula (2)

where each of $R^3$ and $R^4$ is independently a hydrogen atom, an alkyl group, or a perfluoroalkyl group.

7. A laminate wherein the polyimide film defined by claim 1 and a hard coat layer containing a polymer of at least one of a radically polymerizable compound and a cationically polymerizable compound, are adjacently disposed.

8. The laminate according to claim 7,
wherein the radically polymerizable compound is a compound containing two or more (meth)acryloyl groups per molecule, and the cationically polymerizable compound is a compound containing two or more groups per molecule, which are selected from the group consisting of an epoxy group and an oxetanyl group.

9. A surface material for a display, wherein the surface material is the polyimide film defined by claim 1.

10. The surface material for a display according to claim 9, wherein the surface material is a surface material for a flexible display.

11. A surface material for a display, wherein the surface material is the laminate defined by claim 7.

12. The surface material for display according to claim 11, wherein the surface material is a surface material for a flexible display.

13. The polyimide film according to claim 1, wherein the yellowness index calculated in accordance with JIS K7373-2006 is 2.0 or less.

14. The polyimide film according to claim 1, wherein, in the general formula (1), $R^2$ is a divalent group that is a diamine residue, and 30 mol % to 50 mol % of total $R^2$s are diamine residues each in which a total number of silicon atoms in a main chain thereof is one or two, and 50 mol % to 70 mol % of total $R^2$s are diamine residues each containing no silicon atom and containing an aromatic ring or aliphatic ring.

15. The polyimide film according to claim 1, wherein:
10 mol% to 50 mol% of total $R^2$s are diamine residues each in which a total number of silicon atoms in a main chain thereof is one or two, and
50 mol% to 90 mol% of total $R^2$s are diamine residues each containing no silicon atom and containing an aromatic ring.

\* \* \* \* \*